(12) United States Patent
White et al.

(10) Patent No.: US 11,438,283 B1
(45) Date of Patent: *Sep. 6, 2022

(54) INTELLIGENT CONVERSATIONAL SYSTEMS

(71) Applicant: PROGRESSIVE CASUALTY INSURANCE COMPANY, Mayfield Village, OH (US)

(72) Inventors: Matthew T. White, Mayfield Village, OH (US); Brian J. Surtz, Mayfield Village, OH (US); Callen C. Cox, Mayfield Village, OH (US)

(73) Assignee: PROGRESSIVE CASUALTY INSURANCE COMPANY, Mayfield Village, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/703,619

(22) Filed: Mar. 24, 2022

Related U.S. Application Data

(63) Continuation-in-part of application No. 16/405,552, filed on May 7, 2019, now Pat. No. 11,297,016, which is a continuation of application No. 15/970,632, filed on May 3, 2018, now Pat. No. 10,305,826.

(51) Int. Cl.
| | | |
|---|---|---|
| *G06N 5/02* | (2006.01) | |
| *H04L 51/02* | (2022.01) | |
| *G06Q 40/08* | (2012.01) | |
| *G10L 15/26* | (2006.01) | |
| *G06N 3/00* | (2006.01) | |
| *G06N 5/04* | (2006.01) | |
| *G06F 40/56* | (2020.01) | |
| *G10L 13/00* | (2006.01) | |

(52) U.S. Cl.
CPC .............. *H04L 51/02* (2013.01); *G06F 40/56* (2020.01); *G06N 3/006* (2013.01); *G06N 5/022* (2013.01); *G06N 5/041* (2013.01); *G06Q 40/08* (2013.01); *G10L 13/00* (2013.01); *G10L 15/26* (2013.01)

(58) Field of Classification Search
CPC .. G06Q 40/08; G06Q 10/06316; G06Q 40/00; G06N 99/005
See application file for complete search history.

(56) References Cited

U.S. PATENT DOCUMENTS

| | | | | |
|---|---|---|---|---|
| 7,124,088 | B2 * | 10/2006 | Bauer .................... | G06Q 40/08 705/4 |
| 8,346,563 | B1 * | 1/2013 | Hjelm ................. | G10L 15/1822 704/251 |

(Continued)

*Primary Examiner* — Paulinho E Smith
(74) *Attorney, Agent, or Firm* — Lempia Summerfield Katz LLC

(57) ABSTRACT

A system and method simulate conversation with a human user. The system and method receive media, convert the media into a system-specific format, and compare the converted media to a vocabulary. The system and method generate a plurality of intents and a plurality of sub-entities and transform them into a pre-defined format. The system and method route intents and the sub-entities to a first selected knowledge engine and a second knowledge engine. The first selected knowledge engine selects the second knowledge engine and each active grammar in the vocabulary uniquely identifies each of the knowledge engines.

30 Claims, 18 Drawing Sheets

(56) References Cited

U.S. PATENT DOCUMENTS

| | | | | |
|---|---|---|---|---|
| 8,433,588 B2* | 4/2013 | Willis | | G06Q 40/08 |
| | | | | 705/2 |
| 8,924,410 B2* | 12/2014 | Bierner | | G06F 16/3322 |
| | | | | 707/768 |
| 9,183,593 B2* | 11/2015 | Willis | | G06Q 40/08 |
| 9,305,548 B2* | 4/2016 | Kennewick | | G06F 3/167 |
| 9,652,805 B1* | 5/2017 | Clawson, II | | G06Q 30/0611 |
| 9,916,625 B2* | 3/2018 | Lehman | | G06Q 20/322 |
| 2004/0111330 A1* | 6/2004 | Stanton | | G06Q 40/00 |
| | | | | 705/4 |
| 2006/0143093 A1* | 6/2006 | Brandt | | G16H 10/20 |
| | | | | 705/26.1 |
| 2008/0065426 A1* | 3/2008 | Ziade | | G06Q 40/08 |
| | | | | 705/4 |
| 2008/0269958 A1* | 10/2008 | Filev | | A61B 5/165 |
| | | | | 701/1 |
| 2010/0023320 A1* | 1/2010 | Di Cristo | | G06F 40/232 |
| | | | | 704/E15.001 |
| 2010/0100398 A1* | 4/2010 | Auker | | G06Q 50/01 |
| | | | | 705/4 |
| 2011/0289015 A1* | 11/2011 | Mei | | G06Q 30/0282 |
| | | | | 705/347 |
| 2012/0221357 A1* | 8/2012 | Krause | | H04L 51/52 |
| | | | | 705/4 |
| 2012/0262296 A1* | 10/2012 | Bezar | | G10L 15/02 |
| | | | | 704/200 |
| 2013/0204645 A1* | 8/2013 | Lehman | | G06Q 40/08 |
| | | | | 705/4 |
| 2013/0226892 A1* | 8/2013 | Ehsani | | G06F 16/9535 |
| | | | | 707/706 |
| 2014/0046891 A1* | 2/2014 | Banas | | G06N 5/022 |
| | | | | 706/46 |
| 2014/0129261 A1* | 5/2014 | Bothwell | | G06N 20/00 |
| | | | | 705/4 |
| 2014/0214414 A1* | 7/2014 | Poliak | | G10L 15/30 |
| | | | | 704/228 |
| 2014/0244317 A1* | 8/2014 | Roberts | | G06Q 40/08 |
| | | | | 705/4 |
| 2014/0250116 A1* | 9/2014 | Hsu | | G06F 16/951 |
| | | | | 707/728 |
| 2014/0280634 A1* | 9/2014 | Mansfield | | H04L 51/52 |
| | | | | 709/206 |
| 2014/0330594 A1* | 11/2014 | Roberts | | G06Q 40/08 |
| | | | | 705/4 |
| 2015/0142447 A1* | 5/2015 | Kennewick | | G10L 15/24 |
| | | | | 704/275 |
| 2015/0261744 A1* | 9/2015 | Suenbuel | | G06F 40/211 |
| | | | | 704/9 |
| 2016/0048936 A1* | 2/2016 | Perkowski | | G06Q 10/063 |
| | | | | 705/310 |
| 2016/0078544 A1* | 3/2016 | Brady | | G06Q 40/08 |
| | | | | 705/4 |
| 2017/0032466 A1* | 2/2017 | Feldman | | G06Q 50/16 |
| 2017/0270921 A1* | 9/2017 | Arslan | | G06F 40/247 |
| 2017/0272396 A1* | 9/2017 | Chhaya | | H04L 67/535 |
| 2017/0323319 A1* | 11/2017 | Rattner | | G06Q 30/0206 |

* cited by examiner

FIG. 11

INTELLIGENT CONVERSATIONAL SYSTEMS

1. PRIORITY CLAIM

This application is a continuation-in-part of U.S. Application No. 16,405,552, which is a continuation of Ser. No. 15/970,632, now U.S. Pat. No. 10,305,826, which is the parent of U.S. application Ser. No. 15/982,881, which is now U.S. Pat. No. 10,148,661, each of which are incorporated by reference in their entirety.

BACKGROUND OF THE DISCLOSURE

2. Technical Field

This disclosure relates to enabling computers to execute tasks, and specifically to enabling computers to execute tasks that normally require human intelligence.

3. Related Art

Today, computers execute specific tasks. Computers support word processing, execute searches, and carry out repetitive calculations. Computers enforce security, control processes, and solve deterministic mathematical equations. Many computers do not simulate aspects of human intelligence such as logical deductions, inferences, cognitive tasks, or generate creative replies in response to incomplete information. The computer systems do not recognize or react to human languages or learn from experiences. The systems do not communicate in a form that is like or indistinguishable from human speech.

BRIEF DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like referenced numerals designate corresponding parts throughout the different views.

FIG. 11 is an exemplary landing page rendered by an exchange manager though a virtual assistant.

DETAILED DESCRIPTION

An intelligent conversational system and process (referred to as a system or an interactive agent) converse in an easy and familiar manner. It may converse lightly and casually using an end user's style and vocabulary, in a fashion and a tone that is similar to, or indistinguishable from, that of human speech. The interactive agent moves beyond traditional desktop and mobile processing but is accessible through an application program interface within a celestial architecture.

The celestial architecture decouples backend computing from front-end processing. By using modules and delegations, the interactive agents conduct dialogues from a textual, auditory, vision-based input and/or augmented reality input. The proprietary and open source modules include multiple parts: an interface that determines which constants, data types, variables, and routines that are accessed by other modules, routines and itself; and, private code that is accessible only to the module, which includes the source code that implements the routines in the modules. The modules perform various stages of recognition and implement specific actions.

A delegation assigns access rights from one module to the next. By passing access rights from one module to another, work is distributed such as between several modules, without affecting system security or the integrity of a resource and enabling flexible work distributions and scalability. In the disclosed celestial architecture, some modules are on different machines, operating systems, and/or within different processing domains. A nonreducible textual element of data, a unique structured data object, or a unique token that may be circulated (referred to as a secure data object or a proxy) can be used to make a delegation from one module to another. A proxy allows a module receiving the secure data object or proxy to operate with the same or restricted rights and privileges that are subject to the module providing the grant. A module may create a proxy with the same or fewer rights and privileges than it possesses.

Figure 1:
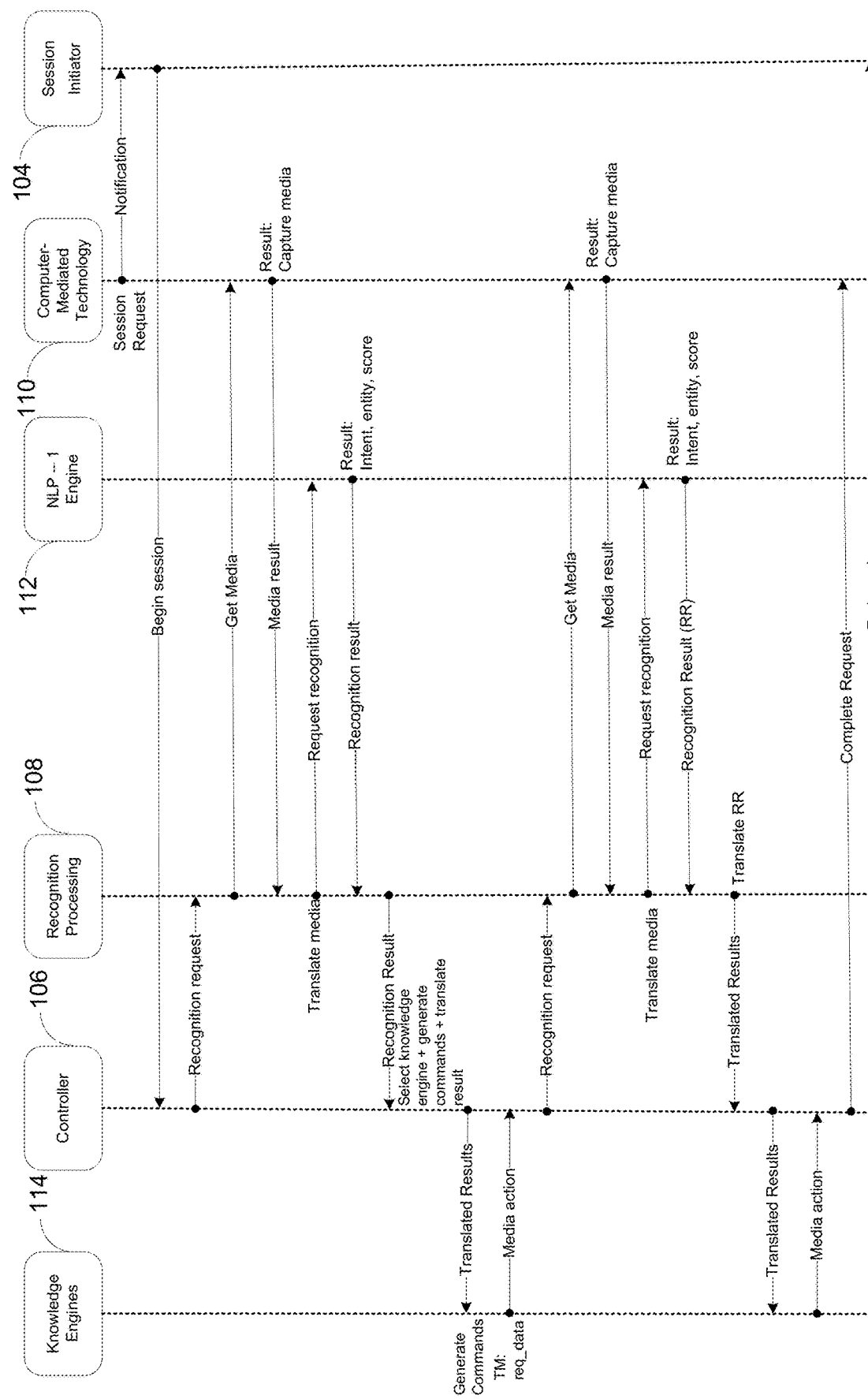
FIG. 1 is a flow diagram of a program that conducts conversations and/or executes tasks from one or more input sources.

In FIG. 1, a controller 106 interfaces knowledge engines 114 and a recognition processor 108. The recognition processor 108 interfaces a natural language processing engine 112 and social media 110. Social media 110 generally refers to computer-mediated technology that enables users to create and share content or send and receive messages or participate in social networking via virtual communities and networks. Computer-mediated technology enables human communication that occurs through two or more electronic devices. The devices may provide input from various sources including, but not limited to, audio, text, images, video, augmented reality, etc. Some social media 110 interfaces users through mobile apps, which are computer programs designed to run on mobile devices, such as phones, watches, or tablets.

In FIG. 1 the knowledge engines 114 are the subject matter experts, separate from, but in communication with controller 106. There are one or multiple knowledge engines (that may be designated as N knowledge engines). The knowledge engines 114 interpret and act upon an intent and its sub-entities. An intent generally refers to the interpreted aim or purpose of a computer-mediated communication input. In an insurance context, an intent may ask for an insurance quote or service for an insurance claim or service for an existing insurance policy. Its associated sub-entities provide context to data often in a hierarchical order. A higher-level sub-entity may identify one or more insurance products, such as automobile insurance, motorcycle insurance, condominium insurance, recreational vehicle insurance, renter insurance, etc. and a lower-level sub-entity may provide the information needed to complete an interaction associated with an intent, such as the desired coverage limits for an insurance quote.

Figure 3:
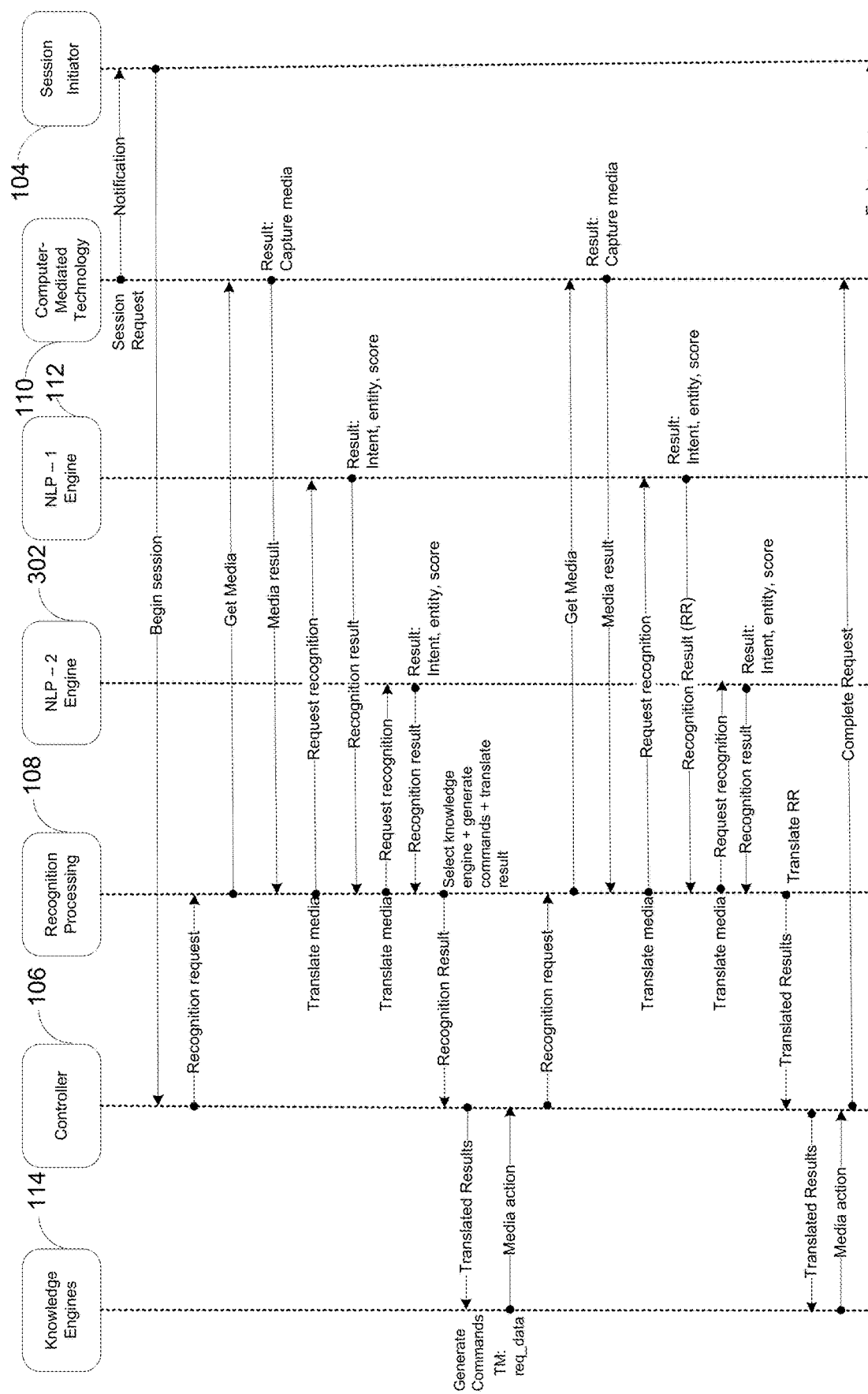
FIG. 3 is a third flow diagram of a program that conducts dialogues and/or executes tasks from one or more input sources.

In FIG. 1, a natural language processing engine 112 uses grammars to identify one or more intents from a conveyance. A grammar may be stored in a file that contains a list of words and phrases to be recognized, and in some instances, include programming logic to aid a module. All active grammars make up a vocabulary. The natural language processing engine 112 takes the translated media, compares it to a vocabulary, and matches the translated media to the vocabulary's words and/or phrases. The natural language processing engine 112 extracts or generates sub-entities from the conveyance and adds them as payload data to the intents to form the data structure that the controller 106 and/or knowledge engine 114 process. The payloads include confidence scores that indicate the likelihood of a successful recognition. One natural language processing engine 112 as shown in FIG. 1, two natural language processing engines 112 and 302 as shown in FIG. 3, or three or more natural language engines (N natural language engines) may be used in alternate interactive agents.

Each knowledge engine (individually and collectively identified by reference number 114) handles a specific type of recognized result. A knowledge engine may serve an insurance quoting system, another knowledge engine may serve a claims processing system, and another knowledge engine may serve on-line insurance servicing of existing insurance policies, for example.

In this disclosure, any module in the systems and methods described may manage dialogue, share dialogue management, or delegate dialogue management with other modules making the interactive agents scalable and secure. If a dialogue management is hosted in a module that becomes infected by an intrusive program, such as a virus or malware that has damaging effects, a distributed dialogue management or delegated management allows the interactive agent to maintain the state and flow of a conversation by transferring dialogue management to an uninfected module before the infected module is isolated. The input and output controls and strategic management controls of the dialogue management can be shared and executed by multiple modules and passed to a single module.

Dialogue is managed through an exchange manager. The exchange manager may standalone, may be integrated with, or may be a unitary part of one or more knowledge engines 114, controllers 106, and/or recognition processors 108 and/or distributed between the modules through delegations. Some exchange managers process one or more representations of the dialogue and maintain state variables, such as a dialogue history making the interactive agent stateful. Stateful means the interactive agents monitor all or substantially all of the details of a dialogue in which it participates and accounts for the source, destination, and the content of a message, for example. A dialogue history may track the details of a dialogue, such as tracking the topics or subjects of the discussion. By analyzing dialogue history and identifying features a user makes use of the most, the interactive agents engage users, avoid repetition, facilitate conversations, build on previous dialogues, and are more likely to service the user's request. A dialogue manager may also track question-answer pairs (e.g., selecting a best answer for a question if there are several answers, or the second best answer, if the first answer was already used, or the third best answer if the second best answer was already used . . . etc.) or the last answered question.

Some exchange managers execute other functions too. Other functions include executing rules, whether machine learned or pre-programmed, to select the best term to use in a dialogue, and/or determine what action the exchange manager should take at each point in the dialogue exchange. To make a response more natural, some exchange managers execute output control. When some exchange managers determine that the interactive agent is communicating with a millennial by detecting one or more phrases millennials frequently use, by semantic comparisons for example, the exchange managers select and respond with a generational-type expression such as "you are slaying it" or uses another phrase millennials commonly use. If the exchange managers determine that the interactive agents are communicating with a baby-boomer, for example, the exchange managers may use a more formal generational-type of response such as "you are doing a great job" or respond with another phrase baby-boomers would use. A biometric module enables this age-based functionality through comparisons of semantic-recognitions to machine-learned or pre-programmed generational defining terms or phrases. The biometric module enables the exchange manager to identify a user's generation when a confidence level of the recognition result exceeds a threshold. The identification identifies or points to a file or vocabulary containing a list of words and phrases associated with that generation that are selectable by a knowledge engine 114 or the controller 106. Selection allows the interactive agent to provide an age appropriate response or modify a response that is published on social media 110.

Besides recognizing unique generational conversational patterns, some exchange managers recognize cultural or social characteristics and/or attitudes via their classifications of active grammars and comparisons to recognition results to personalize and customize the output of the interactive agents. Unlike language recognition that is concerned with recognizing content, cultural and social recognition is concerned with recognizing the unique background behind the user and responding like someone with his or her background. This biometric module compares semantic-recognitions to machine-learned or predesignated defining terms or phrases strongly linked to unique backgrounds, enabling the interactive agent to identify the user's background when a confidence level of the recognition result exceeds a predetermined fixed or dynamic threshold. Once cultural or social characteristics are identified, the interactive agent responds by selecting a vocabulary or output file of words and phrases that are selectable by the knowledge engines 114, controller 106, and/or recognition processing 108 to render an output. The vocabulary is linked to the user's background and, in some interactive agents, the user's generation.

The personalization and customization of the output of the interactive agents may also model one, two, or more personalities. For example, "Flo", the upbeat fictional store employee that sells insurance for Progressive may respond with her very own Flo-isms when a model of her traits is part of the interactive agent. Flo-isms make Flo's personality distinctive and unique. If for example, Flo receives a complaint about someone running late, Flo may respond in a lively manner that makes an emotional connection with the user. A Flo-ism to such a complaint may be "Happens to me all the time." If a user complains about the tedious, menial, and unpleasant work of an annual office meeting, Flo may invite the user to continue their conversation by responding with: "Hey, it's an office party!". The list of words and phrases and programming logic that model Flo's personality traits may be stored in a unique or customizable vocabulary or unique or customizable file that is selectable by the knowledge engines 114, the controller 106, and the recognition processing 108 in response to a recognition result. The knowledge engines 114, the controller 106, and the recognition processing 108 modules may adapt their output via the unique vocabulary or unique file that models the autonomous fictional virtual human that sells insurance.

In other use cases, two or more personalities engage the user in one or more different dialogues. In an insurance context, for example, another unique vocabulary or file may model Mayhem's traits, the fictional character pitching insurance for Allstate Insurance. Mayhem's traits may be modeled via a vocabulary or file the includes a list of words and phrases and programming logic that distinguish his personality from others. Other use cases may make use of a unique vocabulary or file of surreal humor and satirical terms and phrases and programming logic that model an anthropomorphic day gecko like The Gecko pitching insurance for GEICO (Government Employees Insurance Company).

In FIG. 1, a session begins with a request from a session initiator 104. A session initiator 104 may initiate sessions, confirm terminations, and in some instances, maintain sessions. The session initiator 104 responds to a session request from one or more social media 104 by notifying controller 106. The session notification triggers a request for a recognition cycle, which causes the recognition processor 108 to capture the media from the computer-mediated social technology 110. The recognition processor 108 passes through or converts the captured media into a system-specific format that is processed by a natural language processor engine 112. The natural language processing engine results are returned to controller 106. The results include representations of the captured media (i.e., interpretations), process commands, intents, and related sub-entities generated from and/or extracted from the media, confidence scores of the intents, etc. The controller 106 determines which knowledge engines receive the results based on the intents and related sub-entities and confidence scores, which are passed through or are translated into the system-specific formats of the selected knowledge engines 114. In some instances, the selected knowledge engine 114 responds with a request for more information as shown in FIG. 1. The request may include commands to execute one, two, or more recognition cycles (one more recognition cycle is shown), which results in capturing textual or auditory input from social media applications, 110 such as Facebook and Facebook Messenger, for example.

The recognition processor 108 captures the response to the textual or auditory message. The recognition processor 108 converts the captured media into a system-specific semantic format that is processed by the natural language processor engine 112. The results are passed through or translated into the system-specific formats and transmitted to the selected knowledge engine 114. The knowledge engine 114 completes the action or transaction, and communicates via controller 106 to social media 110 before the session ends.

In FIG. 1, the exchange manager is shared with one or more knowledge engines 114. In other embodiments, it is shared through proxies that are passed with the objects to the modules process. The exchange manager processes representations of the dialogue and maintains state variables. Besides tracking the details of the dialogue and its question-answer pairs, the exchange manager executes the functionality described herein, including selecting the best term to use in a dialogue to make the interactive agent response more natural to the user, which may include responses that are similar to responses of the user's generation and/or background and/or one or more personalities.

Figure 2:
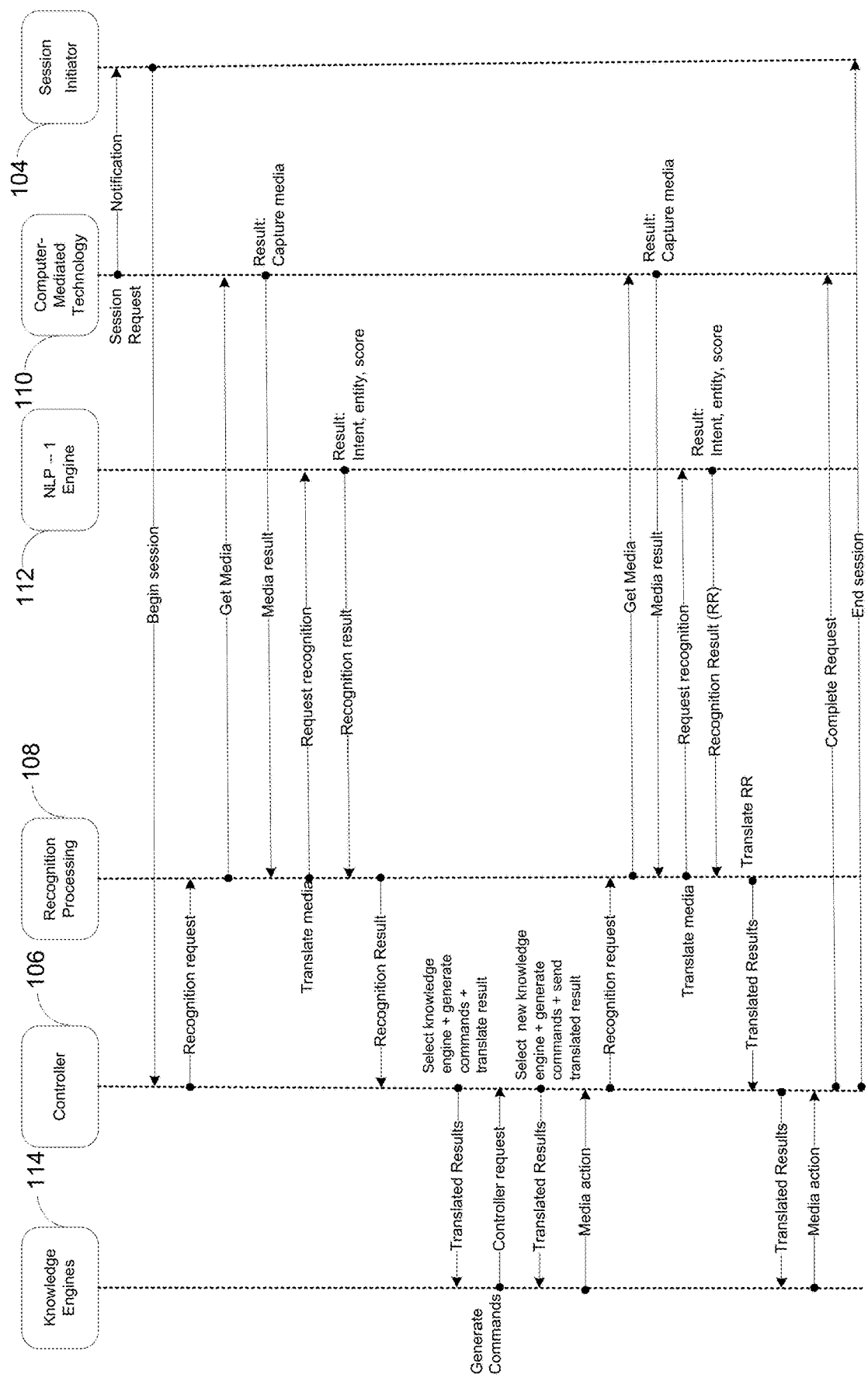
FIG. 2 is a second flow diagram of a program that conducts dialogues and/or executes tasks from one or more input sources.

In FIG. 2, controller 106 executes exchange management. Controller 106 selects a second knowledge engine 114 in response to a request from the first selected knowledge engine 114. A session begins with a request from the session initiator 104. The recognition processor 108 captures the media from the computer-mediated social technology 110 and passes through or converts the captured media into a system-specific format processed by the natural language processor engine 112. The natural language processing engine results include representations of the captured media (i.e., interpretations), process commands, intents and related sub-entities extracted from the media, confidence scores of the intents and/or sub-entity combinations, etc. The results are returned to controller 106, which passes the results or translates them into the system-specific formats and formats required by the selected knowledge engine 114. Knowledge engine 114 selections are based on intents and associated confidence scores or combinations of intents and sub-entities and their associated confidence scores. When confidence scores exceed a predesignated threshold, controller 106 routes the results to the knowledge engine assigned to that recognized result.

Based on a knowledge base associated with the selected knowledge engine 114, the selected knowledge engine 114 in communication with controller 106 may automatically request that the process commands and result be shared with one or more additional knowledge engines 114. A knowledge base is a form of a database that may include rules and accumulated information related to the particular domain associated with one or more specific knowledge engines 114 (e.g., insurance quoting, or insurance claims servicing, or insurance policy servicing, etc.) and one or more downloadable profiles. The downloadable profiles identify granular attributes of behavior-based exchanges that indicate the knowledge engine 114 potentially better suited to complete an interaction. By including a knowledge base in this decision, a knowledge engine's automatic selections are not limited to comparisons of designated intent and sub-entity combinations and confidence scores exclusively. This behavior-based selection constitutes an improvement over traditional text matching and threshold comparisons as this interactive agent interprets a user's intentions in contexts (via recognizing holistic behavior-based or context-sensitive exchanges by considering statements that surround a word or passage), rather than being based exclusively on isolated input. The inclusion of sub-textual analysis enables a more flexible, nuanced, and accurate dialogue that can easily be tailored to the interactive agent's policies or customized to its user types. Further, access to a knowledge base improves the accuracy of knowledge engine 114 selections. As a result, fewer interactions with the user are needed to adequately respond to a user's request, which enhances computer efficiency and improves computer battery life. These benefits improve user experiences.

Consider an exchange with a new insurance user (e.g., not a customer of the insurance carrier) that uses the term "comprehensive" in multiple exchanges. In this use case, the interactive agent automatically concludes that the user has demonstrated an unfamiliarity with insurance based on the user's inability to answer common insurance questions. In viewing the context, the recentness of a predetermined number of unanswered or misunderstood questions, the confirmation that the user is not a customer of the insurance carrier (e.g., confirmed via the system's credential verification), and the use of the term "comprehensive", the knowledge base associates these contexts as a request for an all-inclusive quote for insurance. The knowledge engine 114 accessing the knowledge base, and/or in communication with the controller 106 determines that the user is likely asking for a home, an auto, a health, and a life insurance quote, that may be known as a bundled quote.

If a system processes the term "comprehensive" alone on its face, and specifically with respect to automobiles, the term "comprehensive" would be understood to refers to one of three basic insurance coverages. The two other coverages are liability and collision. Collision covers damage to vehicles following a collision—and comprehensive fills in the gaps by covering damage to vehicles caused by anything other than a collision (e.g., storm damage, fire, vandalism, animals, etc.). While a recognition of the input alone would determine that the recognition result should be routed to knowledge engine supporting only insurance policy servicing and possibly vehicles specifically; based on the identified contexts and context associations stored in the knowledge base, the selected knowledge engine 114 (in some cases with controller 106) automatically requests that the process commands and result be shared with one or more knowledge engines servicing insurance quoting. This automated decision may also be based on comparisons of the results the first selected knowledge engine rendered processing the input, and the profile of behaviors. The profile of behaviors is referred to as downloadable because they are generated separately and apart from the knowledge base in this embodiment. In alternate embodiments, the knowledge base is local to the knowledge engine 114 and/or controller 106 and is updated whether machine learned or updated via programing. The profile of behaviors may associate behaviors with rules and/or data that achieves one or more knowledge engine 114 selections that based on the user's input and context of the exchange.

In FIG. 2, the selected knowledge engine's request triggers the selection of a second knowledge engine by controller 106. The controller 106 may convert the natural language processing engine results to a second form, format, and/or protocol if different from the first translation, or pass it through. If the second selected knowledge engine 114 responds with a request for more information as shown in FIG. 2, one or more recognition cycle occurs (one more additional recognition cycle is shown). The second recognition cycle captures the requested textual or auditory information from the computer-mediated social technology 110.

The recognition processor 108 converts the captured media into a system-specific format that is then processed by the natural language processor engine 112. The results are passed through or translated into the one or more forms, formats, and/or protocols of the first and/or second knowledge engines. The results are then transmitted to the selected first and/or second knowledge engines 114. The knowledge engines 114 complete the action or transaction; it confirms the completed the action or transaction; and the controller 106 terminates the session.

In FIG. 3, two recognition cycles are executed using two separate and remote natural language processing engines 112 and 302. The celestial based architecture interfaces local and remote natural language processing engines including cloud-based natural language recognizers and/or local natural language recognizers. Some local natural language recognizers apply fewer grammars, and in some applications, the local natural language recognizers are always listening for requests for a recognition. In alternate embodiments, more than two natural language processors are used and some of the natural language processors serve different forms of recognition results. Some natural language processing engines may provide intent-entity combinations and associated confidence score results in some interactions. Other natural language processing engines may provide complete responses that may be published directly through social media 110 immediately without further processing. The other natural language processing engines may serve canned responses, such as responses to frequently asked questions, for example.

Social media 110 triggers the first recognition cycle by sending a request to the session initiator 104, which requests a session and a recognition cycle from controller 106. The recognition processor 108 captures media from the computer-mediated social technology 110 and converts it into a system-specific format processed by a natural language processing engine 112. The natural language processing engine results include representations of the captured media (i.e., interpretations), process commands, intents and related sub-entities based on or extracted from the media, confidence scores of the intents or intent sub-entity combinations, etc. When results are returned, recognition processor 108 determines if additional recognition is needed via a second recognizer, such as the second natural language processing engine 302 shown in FIG. 3. The second natural language processing engine 302 comprises a common natural language processing engine but uses different active grammars (e.g., the words and phrases recognized by the language processing engine). In an alternate embodiment, the second natural language processing engine 302 comprises a separate natural language processing platform (e.g., a different natural language processing engine and vocabulary). Some natural language processing engines are cloud-based and remote from one another; others are local and part of a natural language processing platform. Each alternate embodiment provides one or more specific advantage or particular purpose to solve a problem rather than serving as a design choice. Among the advantages and purposes are the benefits of reduced memory resources when interactive agents use common natural language processing engines and more processing power when interactive agents use multiple natural processing engines and vocabularies. Another advantage includes access to larger vocabularies and remote accessibility when interactive agents use cloud-based natural language processing platforms and uninterrupted access when the natural language processing occurs locally. There is very little or no network dependence or bandwidth restrictions when processing occurs locally. In some embodiments, both local and cloud-based systems provide the benefits and advantages described above and overcome the deficiencies described above.

When additional recognition is needed via a second recognizer, such as shown in FIG. 3, the recognition processor 108 passes through or converts the captured media into the system-specific format that is processed by the second natural language engine 302. The recognition results generally include representations of the captured media (i.e., interpretations), process commands, intents and related sub-entities based on or extracted from the media, confidence scores of the intents and/or intents and sub-entity combinations, etc. The natural language processing engines 112 and 302 results are returned to controller 114, which passes them through or translates them into the system-specific formats of a selected knowledge engine 114. One or more knowledge engines may be selected based on a combination of intents and sub-entities and associated confidence scores. A translation may transform the results into a predefined form, format, and/or protocol for the selected knowledge engine 114 and generates process commands that are passed to the selected knowledge engines 114. In some dialogues, a knowledge engine 114 responds with a request for more information as shown in FIG. 3. The request may include commands to execute one or more recognition cycles (one more is shown) by one or both of the natural language processing engines 112 and 302. The request results in capturing additional textual or auditory input.

In this recognition cycle, the recognition processor 108 captures the next textual or auditory input. The recognition processor 108 passes through or converts the captured media into a system-specific semantic format that is processed by one or both of the natural language processor engines 112 and/or 302. The natural language results are passed through or translated into the system-specific formats, which are transmitted as translated results to the selected knowledge engines 114. The knowledge engine 114 thereafter completes an action or transaction or executes another recognition cycle before it confirms the completed request via social media 110. Once confirmed, the controller 106 terminates the session.

Figure 4:
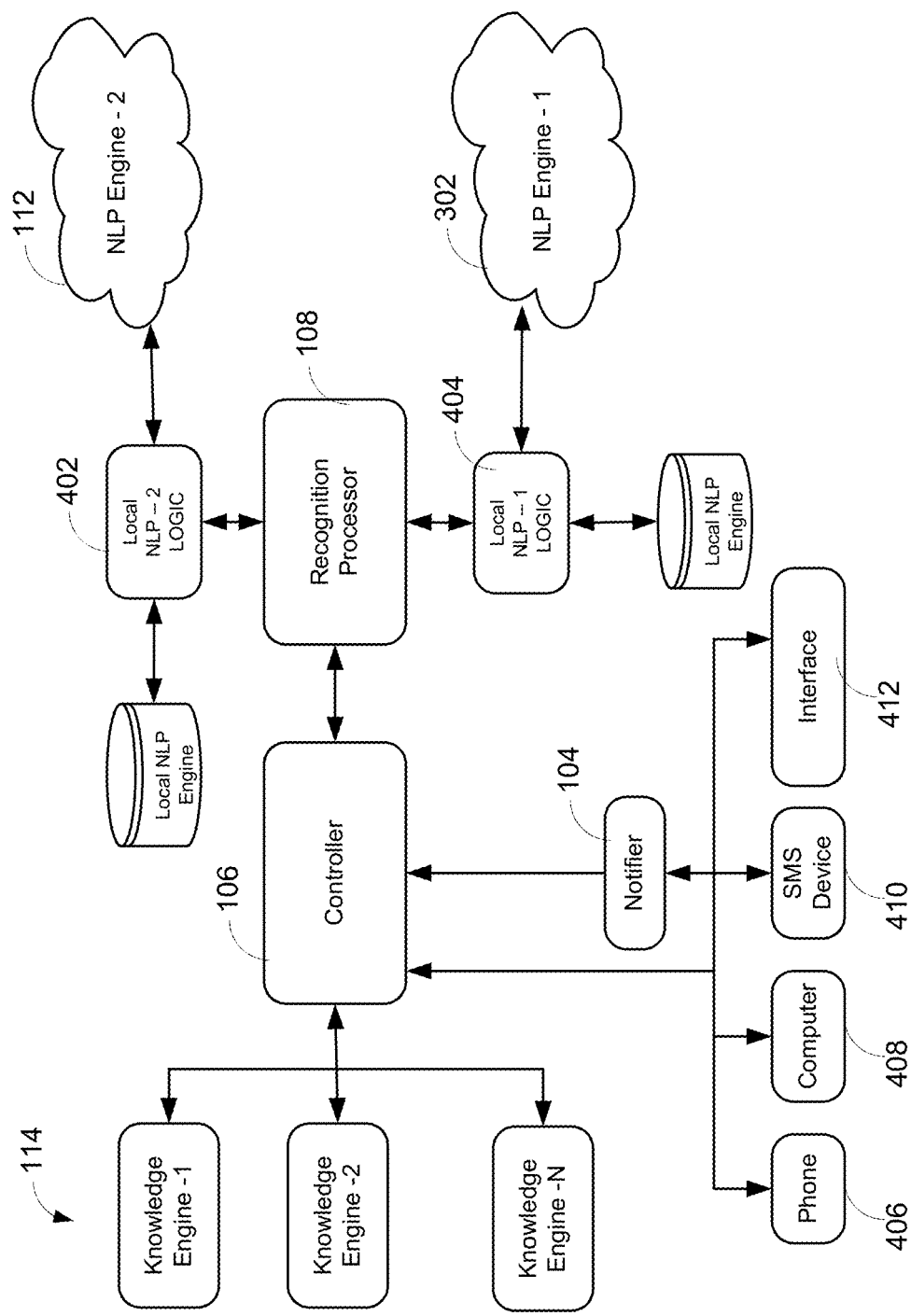
FIG. 4 is a block diagram of an intelligent conversational system.

FIG. 4 is a block diagram of the interactive agent that may execute the process flows described above and those shown in FIGS. 1-3 automatically. In FIG. 4, the recognition processor 108 interfaces two natural language processing engines 112 and 302 through abstraction level logic 402 and 404. The natural language processing engines 112 and 302 may be local and/or cloud-based (e.g., remote). A natural language platform collects social media input, passes the dialogue to one or both of the natural language processing engines 112 and 302 or more —1 through N if used in alternate embodiments (not shown)—and passes the recognition results to controller 106. The recognition results are assigned a confidence score or rating that reflect the likelihood of an accurate recognition by the one or more natural language processing engines 112 and 302. The natural language processing engines 112 and 302 are separate from the knowledge engines 114 (1 though N shown) that process the recognition results. Each of the knowledge engines 114 process specific types of recognized results. In some insurance based systems, one knowledge engine handles insurance quoting, a second knowledge engine handles claims processing, a third knowledge engine handles insurance servicing of existing insurance policies, a fourth knowledge engine handles usage-based insurance, and/or a fifth knowledge engine handles another function.

In FIG. 4, the interactive agent includes a session indicator 104 that initiates sessions and confirms terminations. A session refers to the time during which an interactive agent processes a dialogue. In FIG. 4, the session indicator 104 and controller 106 interfaces phones 406, computers 408, short-message-service devices 410, and other interfaces 412 that provide interactions with other devices such as vehicles and/or smart homes. In FIGS. 4, 5, 9, 10 and 18, interface 412 is a point of interaction or a communication between the interactive agent and any other entity, such as computer, acoustic modeler 1704, or human operator. The interface 412, for example, may comprise a human machine interface (HMI) where interactions between the interactive agent and a human operator occurs. If an interactive agent requires assistance beyond its knowledge engines 114, the interactive agent may seamlessly hand off the exchange to the human operator to complete a task or continue the conversation. The interface 412 may be used to modify the knowledge engines 114, modify or supplement vocabularies, and/or modify module code to train the interactive agents.

Besides the programming that allows the interactive agents to detect cues that make it possible to understand a dialogue, the interface 412 may serve as a point of interaction to process training data. The training data may reflect a range of conditions that include telemetry data that cover some or all of the subject matter domains and various operating states described. Further, when speech processing is used, the training data may include speech in relatively quiet and noisy settings as well as speech recorded in highly stressful conditions. The data may be processed concurrently or off-line to improve system performance.

Figure 5:
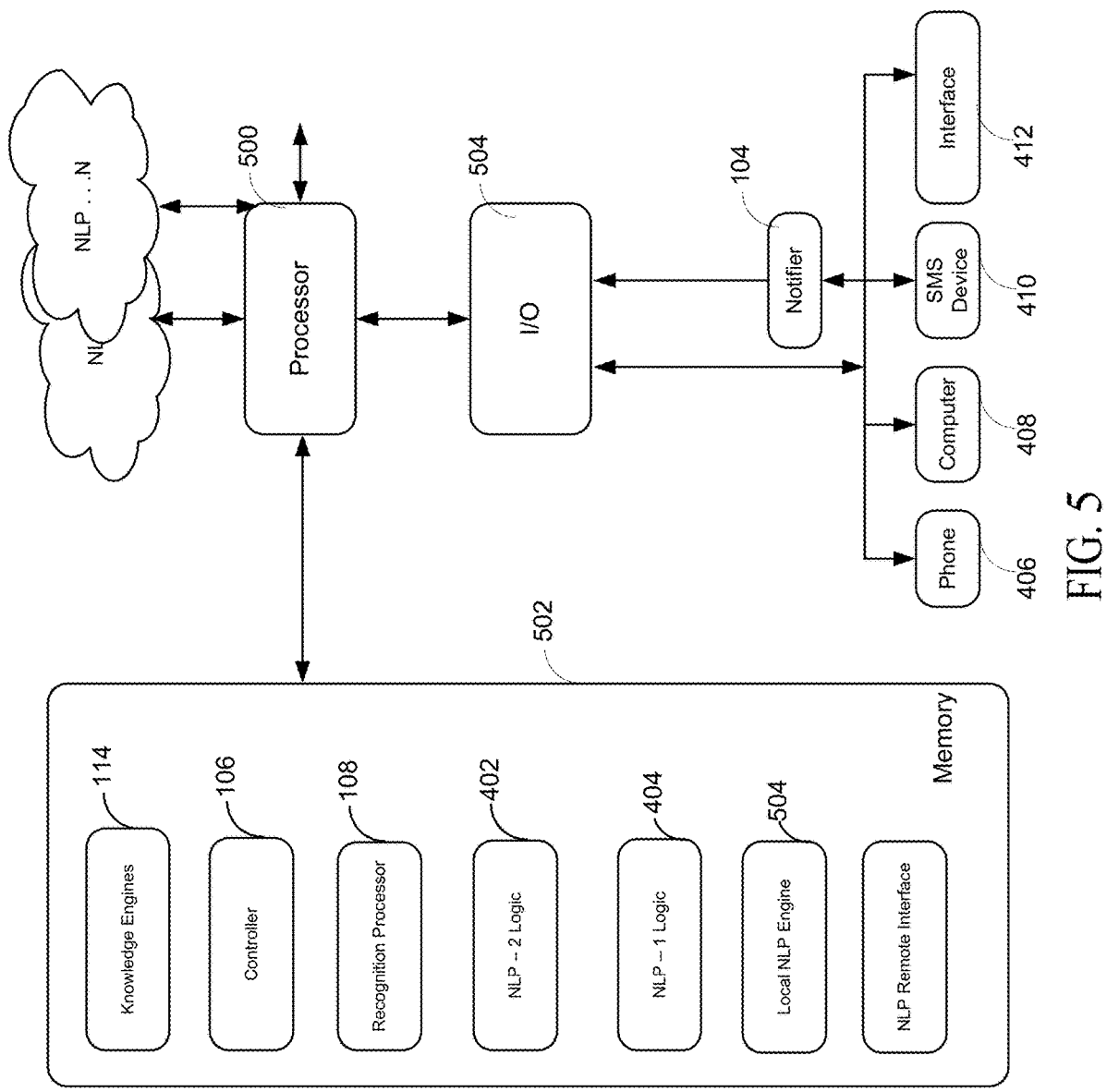
FIG. 5 is an alternate block diagram of an intelligent conversational system.

FIG. 5 is a block diagram of an alternate interactive agent that may execute the process flows described above and those shown in FIGS. 1-3 automatically. The system comprises a processor 500, a non-transitory media such as a memory 502 (the contents of which are accessible by the processor 500), a session initiator 104, and an I/O interface 504. The I/O interface 504 connects devices and local and/or remote applications such as, for example, additional local and/or remote recognition modules and local and/or remote knowledge engines. The memory 502 store instructions which when executed by the processor 500 causes the interactive agent to render some or all of the functionality associated with interpreting dialogue and executing an appropriate action. The memory 502 stores instructions, which when executed by the processor 500, causes the interactive agent to render the functionality associated with the knowledge engines 114, controller 106, recognition processor 108, abstraction level logic 402 and 404, the local natural language processing engine 504, and/or the software that interface the remote natural language processing engine shown as a cloud.

Figure 6:
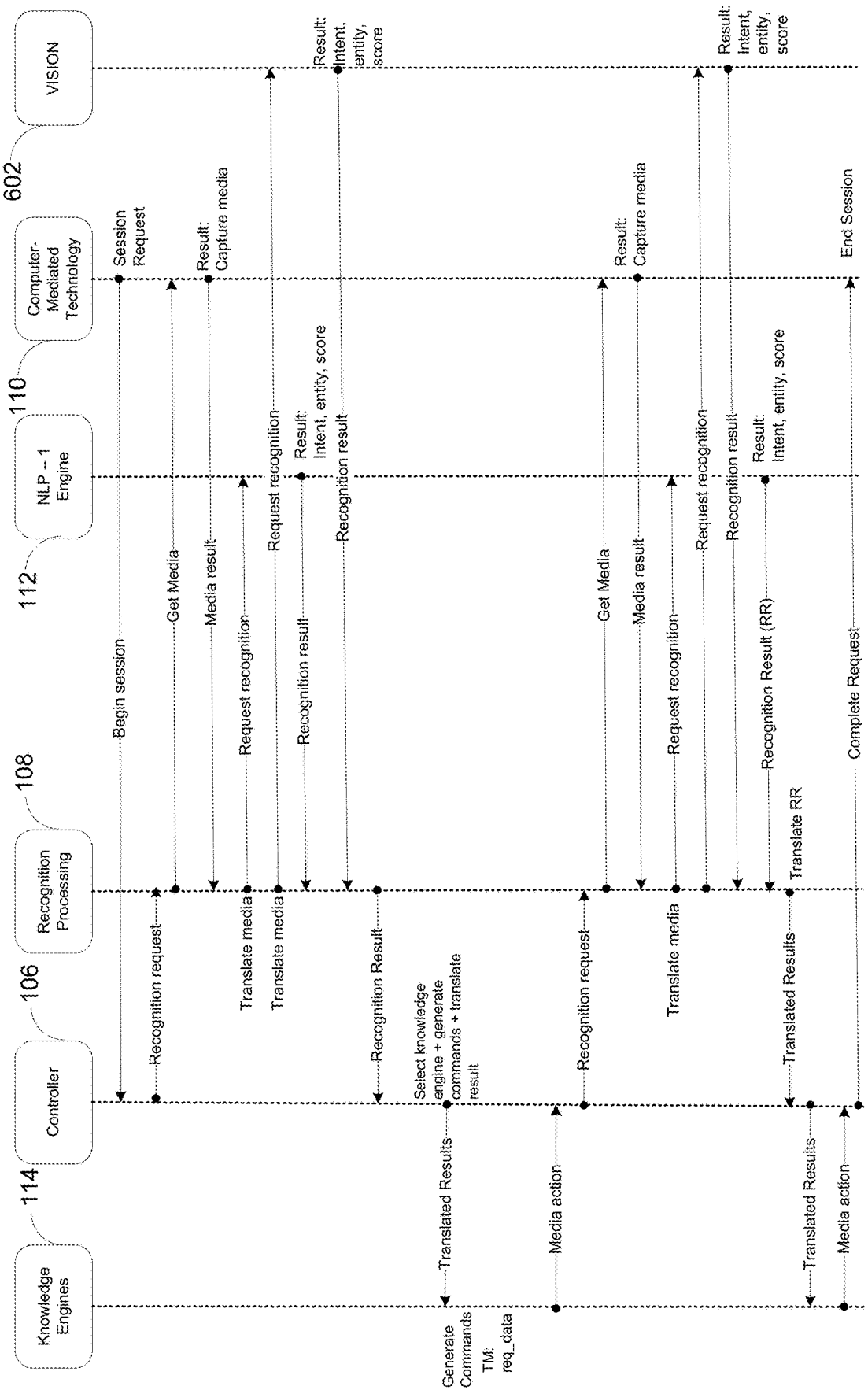
FIG. 6 is a fourth flow diagram of a program that conducts dialogues and/or executes tasks from one or more input sources.

In FIG. 6, natural language processing and computer vision is used to process text, locate physical objects, and identify physical objects. Computer vison may stand alone, may be integrated with, or may be a unitary part of any one or more modules described herein. The physical objects may be identified from image or a video sequence. In FIG. 6, a session begins with a request from the session initiator 104. The session initiator 104 responds to the session request from one or more social media 104 by notifying controller 106. The session notification triggers a request for a recognition cycle, which causes the recognition processor 108 to capture the media from the computer-mediated social technology 110. The recognition processor 108 converts the captured media into a system-specific format that is processed by the natural language processor engine 112 and/or computer vision engine 602. The natural language processing and computer vision engine results are returned to controller 106. The natural-language results include representations of the captured media (i.e., interpretations), process commands, intents and related sub-entities generated from and/or extracted from the media, confidence scores of the intents, etc. The computer vision results may include physical object identification information, physical object position and orientation information, numerical measurement data, counts and classification of physical objects, images of the physical object, and confidence values related to the physical object identification.

Controller 106 determines which knowledge engines receive the results based on the intents and related sub-entities and confidence scores and/or one or more computer vision results, which are passed through or are translated into the system-specific formats of the selected knowledge engines 114. In some instances, the selected knowledge engine 114 responds with a request for more information as in FIG. 6. The request may include commands to execute one or more recognition and/or image capture cycles (one more recognition and capture cycles are shown), which results in capturing textual, auditory, and/or images or video from social media 110.

The recognition processor 108 captures the textual, auditory, and/or images or video. The recognition processor 108 passes through or converts the captured results into a system-specific format that is processed by the natural language processor engine 112 and/or computer vision engine 602. The recognition results are passed through or translated into the system-specific formats and transmitted to the selected knowledge engines 114. The knowledge engines 114 completes the action or transaction, communicates with social media 110 via controller 106, before the controller 106 terminates the session.

In FIG. 6, the exchange manager is shared with of one or more knowledge engines 114. In some embodiments, it is shared through proxies. The exchange manager processes representations of the dialogue and maintains state variables. Besides tracking the details of the dialogue and its question-answer pairs, the exchange manager executes the functionality that selects the best term to use in the dialogue to make the interactive agent response more natural.

Figure 7:
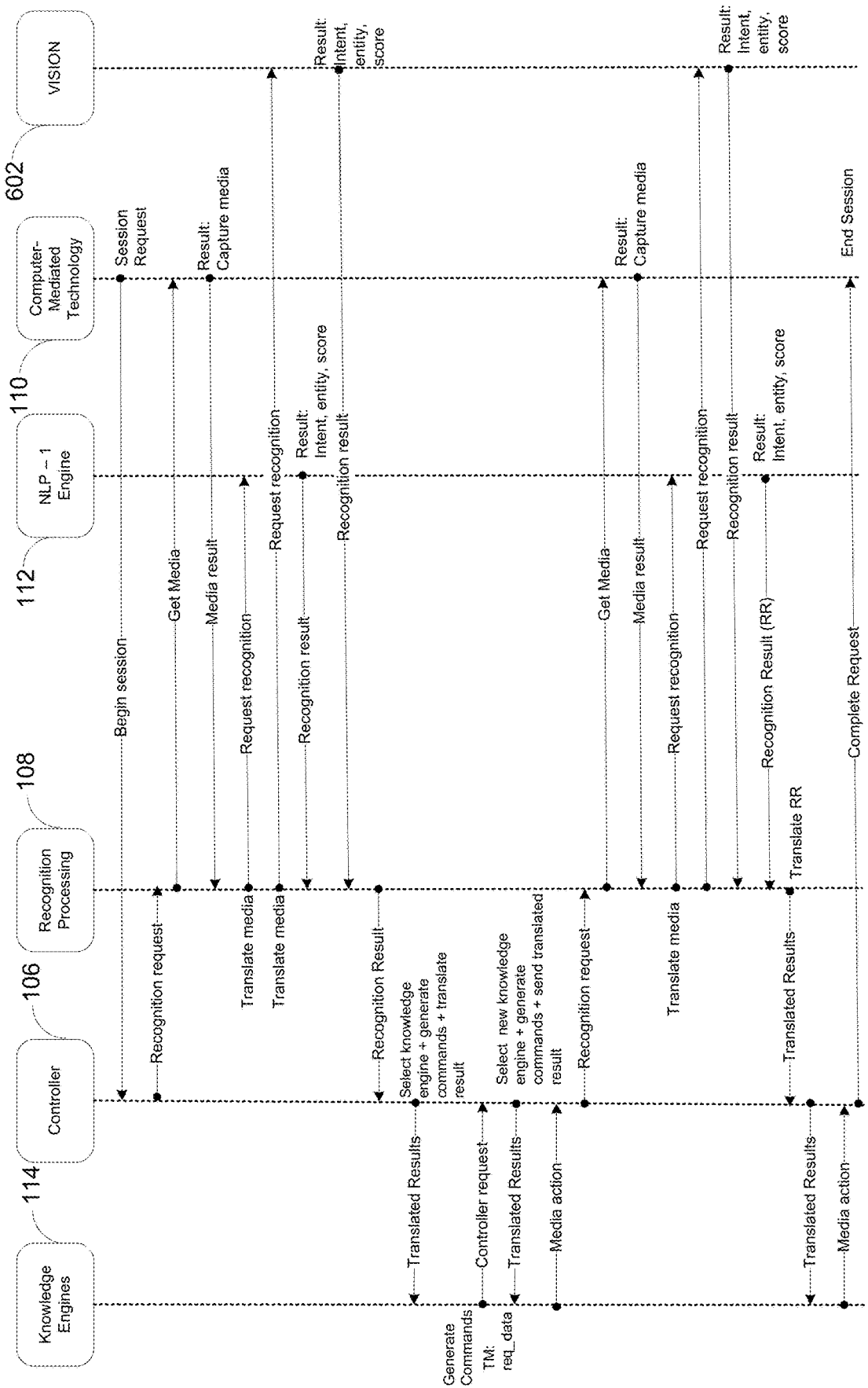
FIG. 7 is a fifth flow diagram of a program that conducts dialogues and/or executes tasks from one or more input sources.

In FIG. 7, the controller 106 executes exchange management. The controller 106 selects a second knowledge engine 114 in response to a request from the first selected knowledge engine 114. A session begins with a request from the session initiator 104. The recognition processor 108 capture the media through the computer-mediated social technology 110 and converts the captured media into a system-specific format processed by the natural language processor engine 112 and/or computer vision engine 602. The natural language processing engine results include representations of the captured media (i.e., interpretations), process commands, intents and related sub-entities extracted from the media, confidence scores of the intents and/or sub-entity combinations, etc. The computer vision results may include physical object identification information, physical object position and orientation information, numerical measurement data, counts and classification of physical objects, images of the physical objects, and confidence values related to the physical object identification.

Controller 106 translates the results into the system-specific formats of the selected knowledge engine 114 or passes them through. Knowledge engine 114 selections are based on intents, physical object data/information, and selections of the highest associated confidence score or combinations of intents and sub-entities and the highest associated confidence scores. In FIG. 7 the results are passed through or translated into a predefined form, format, and/or protocol usable by the first selected knowledge engine 114 and process commands are generated that are passed to the first selected knowledge engine 114.

Based on a knowledge base associated with the selected knowledge engine 114, the selected knowledge engine 114 may request that the process commands and result be shared with another knowledge engine 114. The selected knowledge engine's request triggers the selection of one or more other knowledge engines by controller 106. The controller 106 may pass the results through or convert the results to a second form, format, and/or protocol if different from the first form or translation. If the first and/or second selected knowledge engine 114 responds with a request for more information as shown in FIG. 7, one or more recognition and/or image capture cycle occurs (one more recognition and capture cycles are shown). The second recognition cycle captures the requested textual, auditory, and/or images or video information from the computer-mediated social technology 110.

The recognition processor 108 captures the textual, auditory, and/or images or video. The recognition processor 108 passes through or converts the captured results into a system-specific format that is processed by the natural language processor engine 112 and/or computer vision engine 602. The results are passed through or translated into the one or more forms, formats, and/or protocols of the first and/or second knowledge engines. The passed through or translated results are then transmitted to the selected first and/or second knowledge engines 114. The knowledge engines 114 complete the action or transaction, confirm the completed request, and the controller 106 terminates the session.

Figure 8:
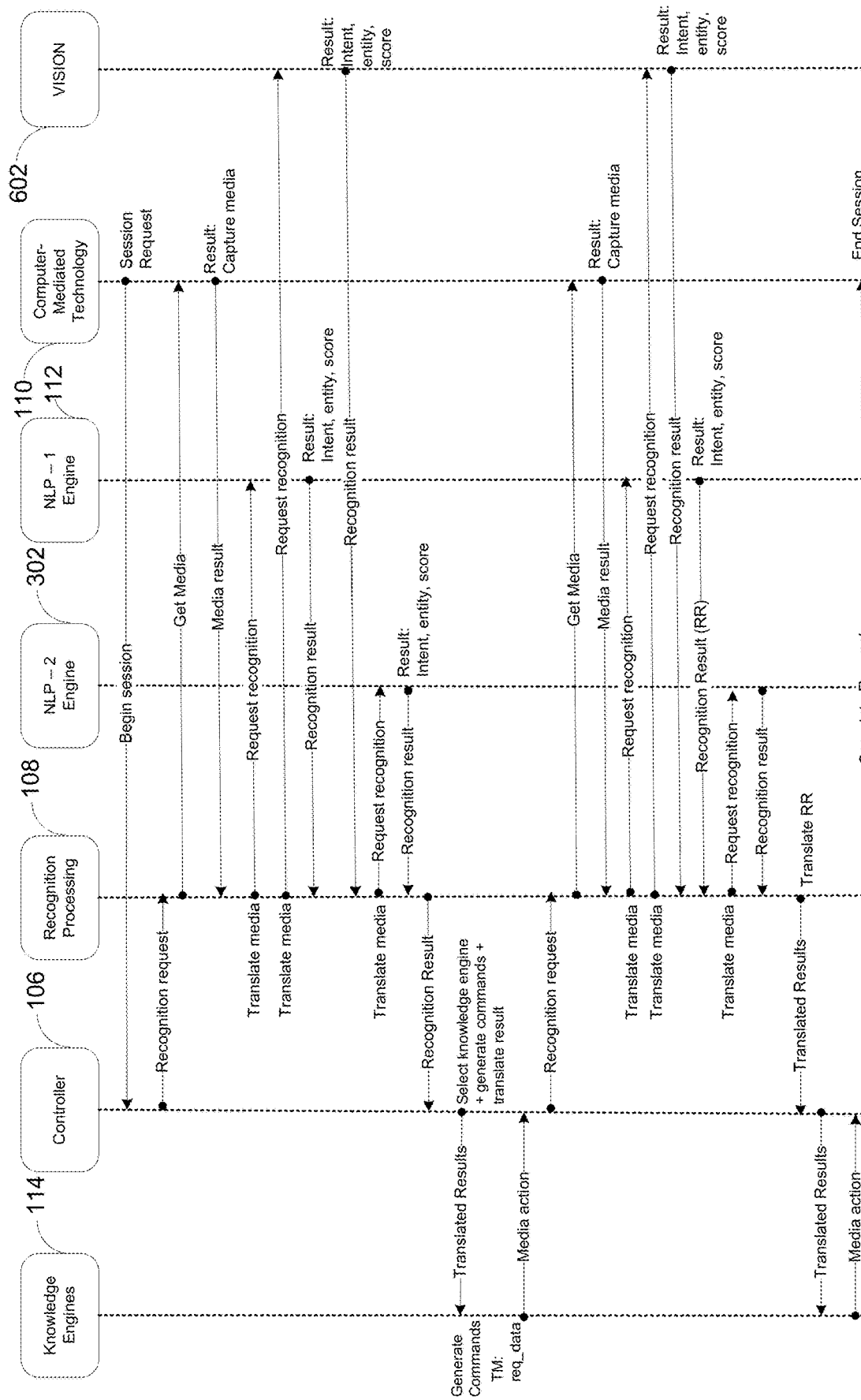
FIG. 8 is a sixth flow diagram of a program that conducts dialogues and/or executes tasks from one or more input sources.

In FIG. 8, two recognition cycles are executed using two separate and remote natural language processing engines 112 and 302. The celestial based architecture interfaces local and remote natural language processing engines including cloud-based natural language recognizers and/or local natural language recognizers having the centralized (e.g., localized) or distributed architectures described above. Social media 110 triggers the first recognition cycle by sending a request to the session initiator 104, which requests a session and a recognition cycle from controller 106. The recognition processor 108 captures media from the computer-mediated social technology 110 and passes it through or converts it into a system-specific format processed by the natural language processor engine 112 and/or computer vision engine 602. The natural language processing engine results include representations of the captured media (i.e., interpretations), process commands, intents and related sub-entities based on or extracted from the media, confidence scores of the intents or intent sub-entity combinations, etc. The computer vision results may include physical object identification information, physical object position and orientation information, numerical measurement data, counts and classification of physical objects, images of the physical objects, and confidence values related to the physical object identification.

When the results are returned, recognition processor 108 determines if additional recognition is needed via a second recognizer such as the second natural language processing engine 302 shown in FIG. 8. When additional recognition is needed, the recognition processor 108 passes through or converts the captured media into the system-specific format that is processed by the second natural language engine 302. The results generally include representations of the captured media (i.e., interpretations), process commands, intents and related sub-entities based on or extracted from the media, confidence scores of the intents and/or intents and sub-entity combinations, etc. The natural language processing engines 112 and 302 results and computer vision results are returned to controller 106, which then passes them through or translates them into the system-specific formats of the selected knowledge engine 114. One or more knowledge engines may be selected based on a combination of intents and sub-entities and associated confidence scores and computer vision results. In some dialogues, a knowledge engine 114 responds with a request for more information as shown in FIG. 8. The request may include commands to execute a one or more recognition cycles (one more is shown) by one or both of the natural language processing engines 112 and 302 and the computer vision 602. The request results in capturing additional textual, auditory, images, and/or video.

The recognition processor 108 passes through or converts the captured media into a system-specific format that is processed by one or both of the natural language processor engines 112 and/or 302 and/or computer vision system. The results are translated into the system-specific formats, which are transmitted to the selected knowledge engines 114. The knowledge engine 114 thereafter completes an action or transaction or executes another recognition cycle before it confirms the completed request via social media 110. Once confirmed, the controller 106 terminates the session.

Figure 9:
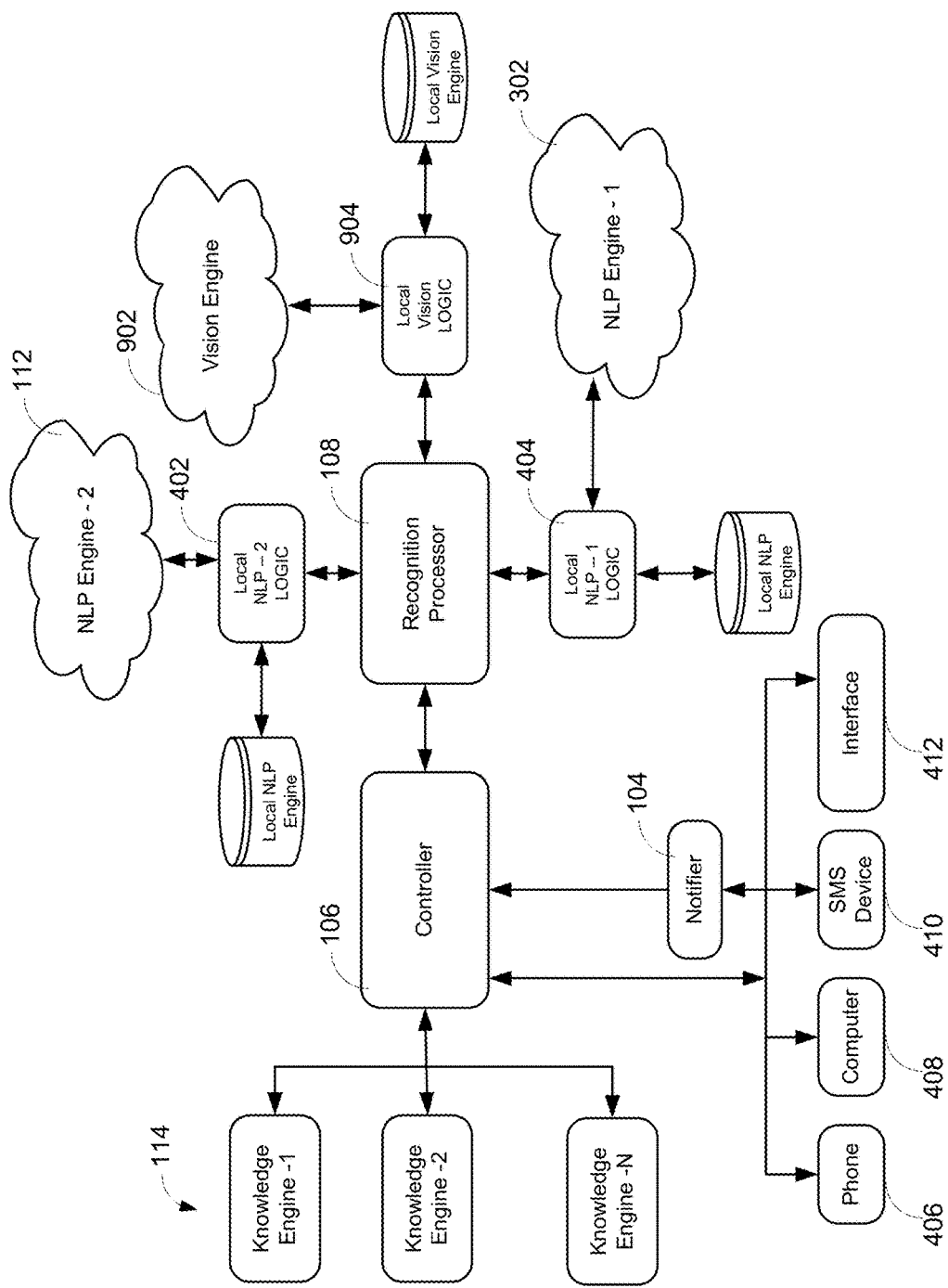
FIG. 9 is a block diagram of an intelligent conversational system with computer vision.

FIG. 9 is a block diagram of the interactive agent that may execute the process flows described above and those shown in FIGS. 6-8 automatically. In FIG. 9, the recognition processor 108 interfaces two natural language processing engines 112 and 302 through abstraction level logic 402 and 404 and a computer vision engine 902 through abstraction level logic 904. The natural language processing engines 112 and 302 may be local and/or cloud-based (e.g., remote). A natural language platform collects social media input, passes the dialogue to one or more of the natural language processing engines 112 and 302 and/or computer vision engines 902, and passes the recognition results to controller 106. The recognition results are assigned confidence scores or ratings that reflect the likelihood of an accurate recognition by one or more natural language processing engines and/or computer vision engines. The natural language processing engines 112 and 302 and computer vision engine 902 are separate from the knowledge engines 114 (1 though N shown) that process the recognition results. Each knowledge engines 114 process specific types of recognized results. In some insurance systems, one knowledge engine handles insurance quoting, a second knowledge engine handles claims processing, a third knowledge engine handles insurance servicing of existing insurance policies, a fourth knowledge engine handles usage-based insurance, and/or a sixth knowledge engine handles other functions.

In FIG. 9, the interactive agent includes a session indicator 104 that initiates sessions and confirms their terminations. The session indicator 104 and controller 106 interfaces phones 406, computers 408, short-message-service devices 410, and other interfaces that provide interactions with other devices such as vehicles and/or smart homes.

Figure 10:
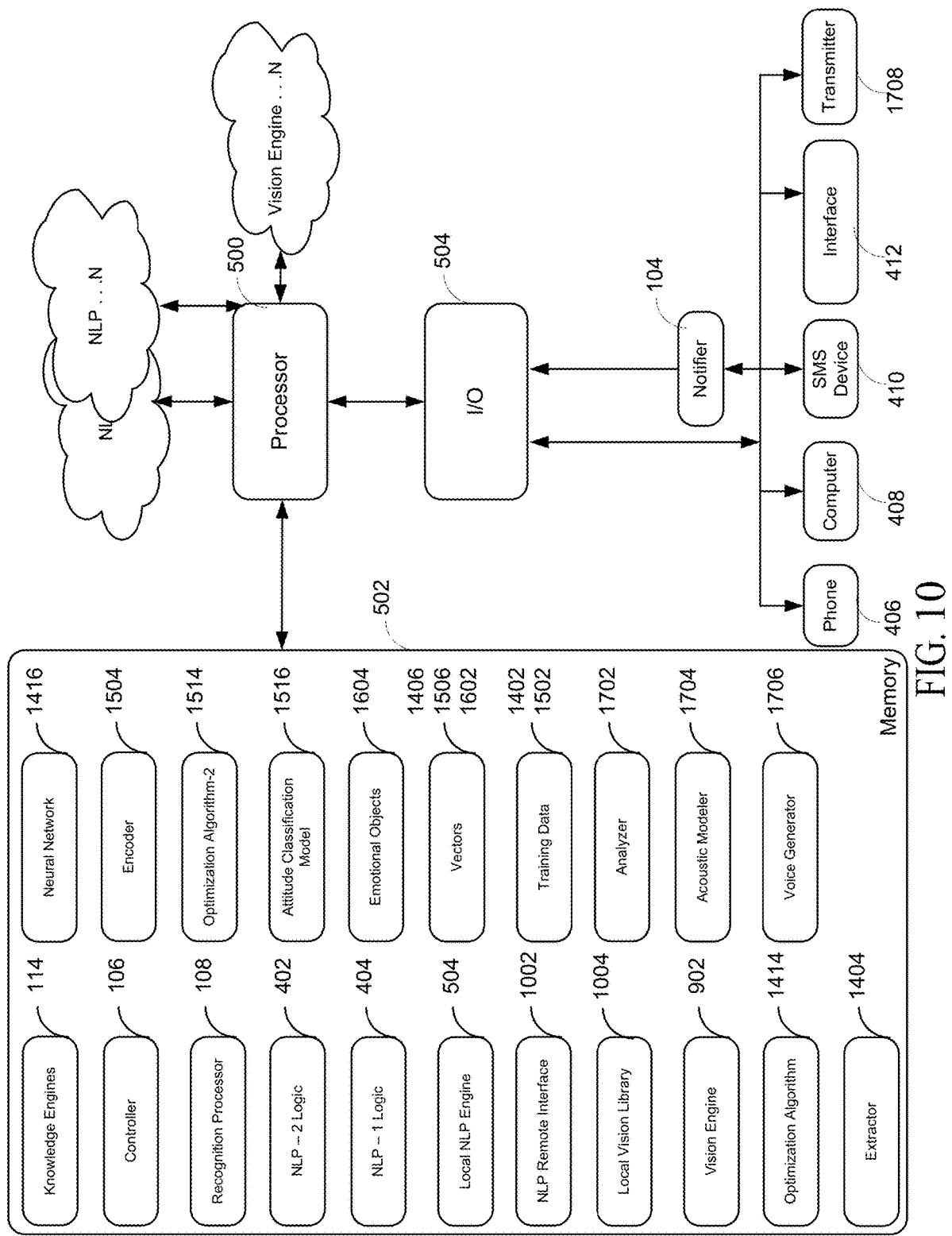
FIG. 10 is an alternate block diagram of an intelligent conversational system with computer vision.

FIG. 10 is a block diagram of an interactive agent that may execute the process flows or associated with the systems and processes described herein including those shown in FIGS. 1-18, automatically. The system comprises a processor 500, a non-transitory media such as a memory 502 (the contents of which are accessible by the processor 500), a session initiator 104, and an I/O (Input/Output) interface 504. The I/O interface 504 connects devices and local and/or remote applications such as, for example, additional local and/or remote recognition and/or computer vision modules and local and/or remote knowledge engines. The memory 502 stores instructions which when executed by the processor 500 causes the interactive agent to render some or all of the functionality associated with interpreting dialogue and executing an appropriate action including those shown in FIG. 10 and described herein. The memory 502 stores instructions, which when executed by the processor 500, causes the interactive agent to render the functionality associated with the knowledge engines 114, controller 106, recognition processor 108, abstraction level logic 402, 404, and 904 (not shown in FIG. 10), the local natural language processing engine 504, the local computer vision engine (cloud-based computer vision engine is also shown), the modules shown, and/or the software that interface the remote natural language processing engine and vision library through a natural language processing remote interface 1002 that interfaces the cloud. The memory 502 also stores instructions that when executed by the processor 500, causes the interactive agent to render the functionality associated with the local vision library 1004, vision engine 902, optimization algorithm 1414, extractor 1404, neural networks 1416, encoder 1504, second optimization algorithm 1514, attitude classifier 1802 (not shown in FIG. 10) and its attitude classification models 1516, emotional objects, training vectors 1406 and 1506, feature vectors 1602, training data 1402 and 1502, analyzer 1702, acoustic modeler 1704, and voice generator 1706.

The memory 502 and/or storage disclosed may retain an ordered listing of executable instructions for implementing the functions described herein, data described herein, and vectors described herein in a non-transitory computer code. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM) or Flash memory, or a database management system. The memory 502 may comprise a single device or multiple devices that may be disposed on one or more dedicated memory devices or disposed on a processor or other similar device. The engines may comprise a processor or a portion of a program that executes or supports recognition system or processes. When functions, steps, etc. are said to be "responsive to" or occur "in response to" another function or step, etc., the functions or steps necessarily occur as a result of another function or step, etc. It is not sufficient that a function or act merely follow or occur subsequent to another. Further, the term "social media" generally refers to computer-mediated technology that enables users to share content or send and receive messages with another entity or device or participate in social networking that may occur via virtual communities and networks. Computer-mediated technology enables human communication that occurs through two or more electronic devices. The devices may provide input from various sources including, but not limited to, audio, text, images, video, augmented reality, etc.

While each of the systems and methods shown and described herein operate automatically and operate independently, they also may be encompassed within other systems and methods including any number (N) of iterations of some or all of the process used to recognize input, render recognized results, and/or render an output. Alternate interactive systems may include any combinations of structure and functions described or shown in one or more of the FIGS. These automated interactive systems are formed from any combination of structures and functions described. The structures and functions may process additional or different input. For example, each of the interactive agents may include a knowledge base and further each interactive agent described may process speech (e.g., spoken utterances). Interactive agents that process speech include automatic speech recognition engines and/or platforms that serve social media 110 and/or speech applications. A speech application, which is often run independently and remote from a speech platform and speech engine, interacts with a user like social media 110. The speech application or social media 110 provides input to the speech platform that passes spoken utterances to a speech engine. The speech engine converts the spoken utterance to a representation, compares the representation of the spoken utterance to a vocabulary, and matches the representation to a vocabulary of words. The speech engine returns its interpretation of the spoken utterance, process commands, intents and related sub-entities, confidence scores of the intents and in some instances confidence scores of the related sub-entities, etc., as a recognition result. The recognition result is passed back to the recognition processor 108, the controller 106, and/or one or more knowledge engines 114 to execute the functions described in each of the embodiments and shown in each of the FIGS separately or in combination.

The functions, acts or tasks illustrated in the FIGS. or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination.

The interactive agents also automate processes that are used every day. Their execution of semantic tasks that respond to intents via knowledge engines 114 and other actionable responses made through natural language processing engines 112 and/or 302 automate manual processes and enhance decision making all day and all night (twenty-four hours a day, seven days a week, fifty-two weeks a year). Interactive agent responses and/or answers are made through social media 110 and are monitored and trained by human representatives. In alternate systems, the interactive agents are monitored and trained by virtual assistants. The interactive agents serve software applications that quote insurance policies, process insurance claims, service insurance policies, and/or serve other local and remote resources, Internet sites, and software applications.

As semantic tasks are executed, the exchange managers track the history of the conversations throughout the architecture by capturing the details of the dialogues. The topics or subjects discussed, the features user's access and make use of including network resources, and the respective confidence scores of the recognitions and answers are some of the exemplary details that the exchange managers track and report. In some systems, a virtual assistant's features allow the interactive agents to train and/or update the knowledge base 114 and its preplanned answers through backpropagations. The backpropagations are relevant to the tasks that the interactive agents execute in response to an interaction. In some systems, the training and/or updates occur empirically, and in other systems, they occur automatically through logic. The backpropagations and training occur during a learning process that update and/or train the one or more knowledge engines 114, the controller 106, natural language processing engines 112 and/or 302 and/or the recognition processors 108.

Figure 11:
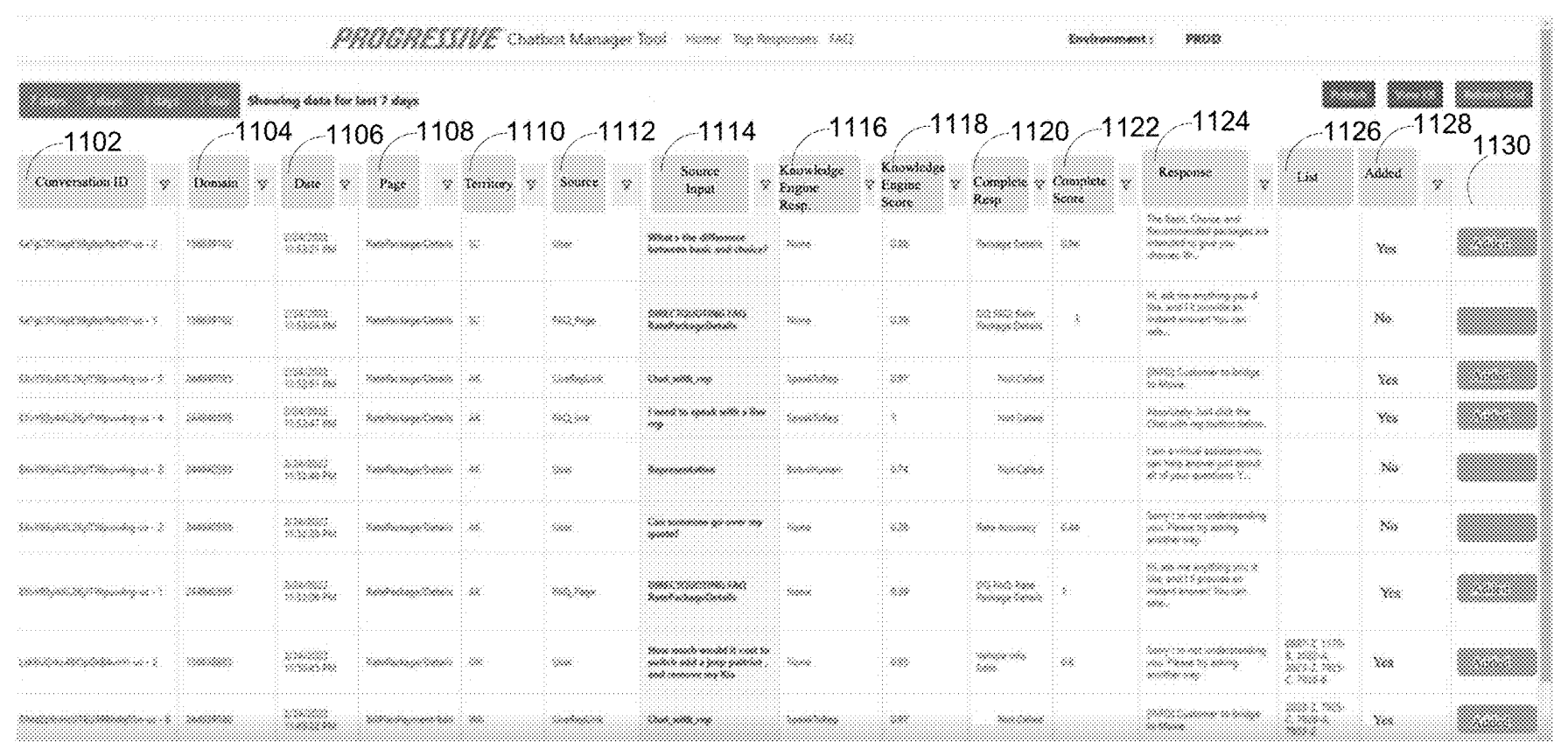

A portal or landing page rendered by the exchange manger through the virtual assistant is shown in FIG. 11. The virtual assistant generates an environment that provides access to programs, files menus, and dialog boxes. An update (such as updating or supplementing a vocabulary, a grammar, or programming a response) works the same way across all the knowledge engine domains and/or natural language processing engine domains that process linguistics in some virtual assistants; in others, they are customized to the application and/or domains. The virtual assistants organize, structure, and/or categorize backpropagated information reducing the time and insight required to train/or and update the interactive agents.

Some virtual assistants track the operating states of all the interactive agents during the dialogues (e.g., conversations). The operating states are captured by a set of data attributes stored in the interactive agent's memory 502 that characterize the conversations during a time period. It comprises data items, that are treated as a unit, which represent the tasks, transactions, and activities that are executed by the processors 108 and/or 500. In some virtual assistants, the dialogue histories store complete records of events and interactions that occur during conversations. Some include a date and time-stamp sequential record of all the events and interactions occurring during a conversation so that when the data is accessed, the virtual assistants can track back and replay a complete interactive session and a recognition cycle. A replay may identify inconsistent operations and identify process breakdowns when and where they occur.

In some systems, the exchange manager and virtual assistants monitor, manage, and organize interactive agents operating on physically separate and/or logically separated networks—some trusted like the local area networks (LAN) supporting product development and product testing and untrusted networks that comprise the external facing systems that interface the Internet and/or other publicly accessible wide area networks that are within a demilitarized zone (DMZ) that are referred to as production. The virtual assistants call application programing interfaces that retrieve information from these networks for any period of time a user or an automated resource selects. In some systems, the timing makes real-time data feeds available through an I/O node, and in other systems, it makes historical data available from batch periods (e.g., such as a prior seven day period as shown in FIG. 11).

The virtual assistants provide discretionary elections from which information is monitored and renders columns on a landing page in some use cases that reflect the status of each of the physically and/or logically separated networks. In an insurance quoting application, for example, a production landing page may render a conversation identification 1102 that identifies the conversation that occurred by a unique serial number and a domain identification 1104 that identifies the conversation through the entity serving or requesting the automated conversation. Quote identifiers are used in FIG. 11 to identify the quote transactions in an exemplary insurance quote domain. The time of the interaction stated in terms of the day, month, and year (e.g., calendar time) and the hours, minutes, and seconds (e.g., clock time) identify the date 1106 when each of the interactions began. The page 1108 column identifies the resource that provided access to the interactive agents such as a rate package and/or a bill payment detail function accessed from an insurance quote application. The territory 1110 identifies the location. In an exemplary insurance quoting application, the territory 1110 identifies the location of the prospective insured or location governing an insurance quote. Because insurance is regulated by state statutes and state rules, the insurance quoting instance identifies the geographic state that governs the insurance quotes. In alternative systems, it comprises geospatial data that render location information in two or three dimensions, global positioning data, and/or is automatically harvested from metadata and/or geospatial metadata that are appended to the messaging (e.g., harvesting geotagging) received by the interactive agents and processed by the controller 106.

In FIG. 11, the source 1112 identifies the entity, source, or person that initiated the conversations. In some applications, interactions begin by a link activation that identifies the communication protocol used to access the interactive agent, in other applications it occurs in direct response to a user or entities' request. In other applications the interactive agent is launched by an interactive page (e.g., an HTML file with associated files for graphics and scripts) or another computer resource automatically without human intervention. The source input 1114 identifies the information received by the interactive agent and the knowledge engines' response 1116 summarizes the conclusions reached by the one or more knowledge engines 114 through the one or more recognition cycles that were executed. The knowledge engines' scores 1118 shows the confidence score (e.g., the confidence levels) that report the likelihood of a successful recognition. The complete response 1120 column identifies the resource or task that called the interaction-response functionality (e.g., question-answer exchanges serviced by natural language processing engines 112 and/or 302 and/or one or more knowledge engines 114) if a call to that functionality is made. In some interactive sessions, interaction-response functions are not called as shown in some of the entries on the landing page of FIG. 11.

In use, some responses such as some of the predetermined responses or canned responses are generated by some natural language processing engines 110 and/or 302, when the knowledge engine confidence score(s) 1118 are below a threshold (e.g., such as below about seventy percent) or when a predetermined response confidence score(s) 1122 exceeds the one or more knowledge engine's confidence score(s) 1118, for example. In the second row of FIG. 11, the confidence score associated with the predetermined response (in this case, a canned response to a frequently asked question) has a confidence score greater than a knowledge engine(s) confidence score(s). The predetermined response is associated with a confidence score of one and the knowledge engines 114 confidence score(s) is about thirty-nine thousands making the predetermined response the response that was delivered by the interactive agent. A short description of the predetermined response 1124 and/or associated meta data is rendered under the response column in FIG. 11.

In FIG. 11, the list 1126 or pilot list identifies the sources of new interactions and new questions the interactive agents receive. It identifies what is driving new content and new interactions. The filter functions shown adjacent to each of the column headings (not referenced but shown as a funnel), allow entities, other software, or users based on supplied criteria that extracts matching and/or relevant records. The filter can be called by users and/or computer resources. The filter sorts content of a range or an array in an ascending or descending order in some virtual assistants, and further by relevance in alternative virtual assistants. A sort by relevance is a search that determines how relevant a given search result is to the input that was entered. Data does not indicate relevance. A relevance sort measures key words and the occurrence of several weighted key words that signal their importance to the search criteria. The weights may be preassigned or assigned when the search function is made.

Figure 12:
FIG. 12 is the exemplary landing page of FIG. 11 showing an activated field.

The filter function reads in the input associated with one or more headings and extracts the input based on the supplied criteria by comparisons and/or relevant analysis, and then writes the output to a memory page or a designated output destination. Conversation details are also available through the virtual assistant or landing page. In FIG. 12 a hover function (e.g., hovering over a link) or a click activation reveals the entire record of an entry such as the response to the unstructured question shown under the source column input of the first row. The interactive agent's predetermined response is shown in the caption box. The knowledge engine's 114 response may similarly be shown when rendered.

Figure 13:
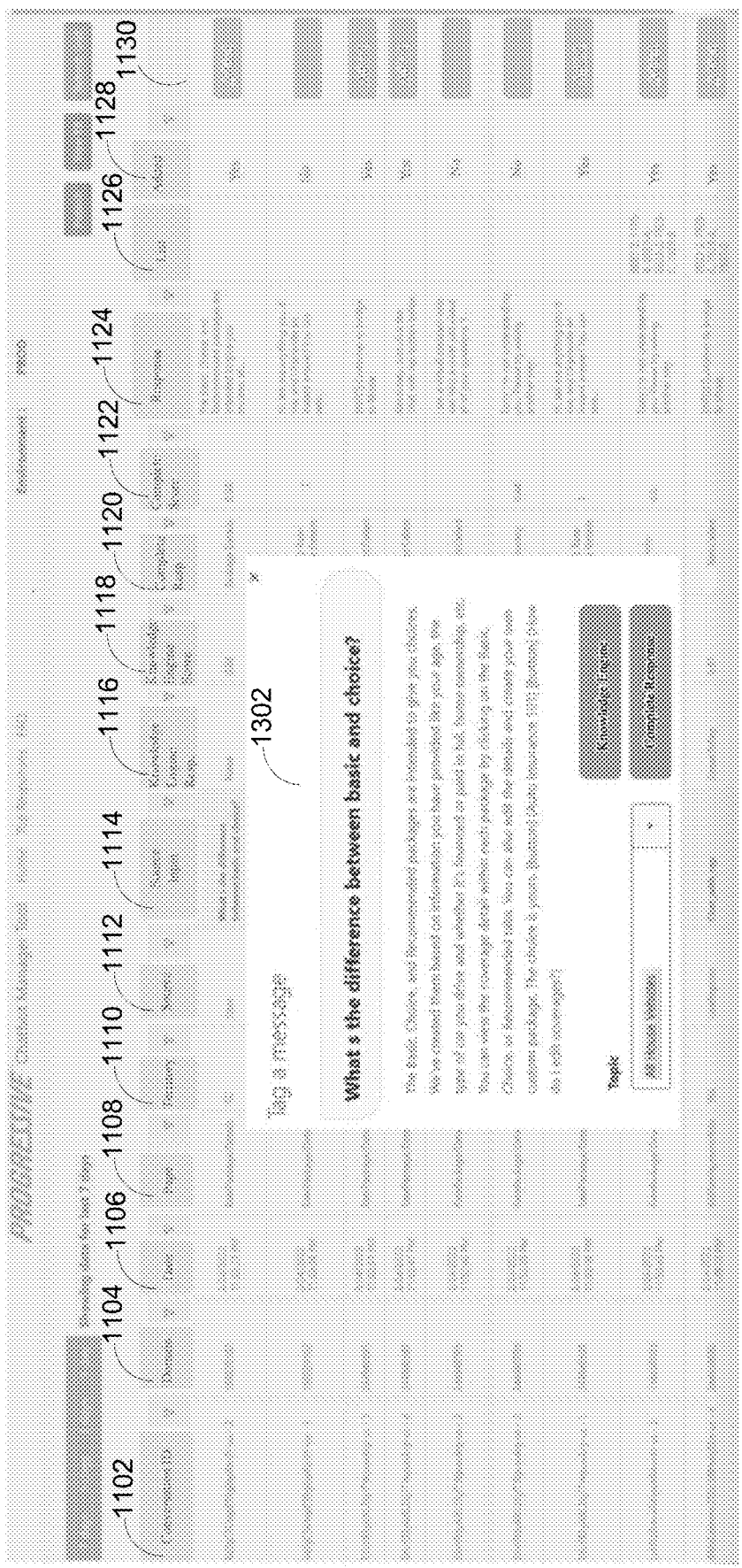
FIG. 13 is the exemplary landing page of FIGS. 11 and 12 showing a tag a message dialogue box.

In FIGS. 11-13, a graphic element, when activated, trains the knowledge engines 114 and/or natural language programming engines 112 and/or 302 through classifications during a learning process. As shown, the "added" annotations that overlay some of the graphic elements 1130 indicate that the interactive analysis were fed back to the knowledge engines 114 and/or predetermined response were added to the natural language processing engines 112 and/or 302 and/or knowledge engines 114 by the click of a button. In operation, the one or more knowledge engines 114, controllers 106, natural language processing engines 112 and/or 302 and/or the recognition processors 108 interpreted the source input 1114 and provided a response. In the first row of FIG. 13, the elected response given was the predetermined response rather than a response made in response to the one or more knowledge engines's analytics. In the first row, the one or more knowledge engines 114 did not generate a response. The message was tagged as a predetermined response and stored in package details topic. Because the response is a highly rated response, it can be tagged as a message, topic labeled, and added to other complete responses under other topics besides the package details as shown by the dialogue box 1302. The learning allows the interactive agents to consistently respond to similar input when presented with new interactions in other topics and domains. Other applications, allow input and messages generated from the one or more knowledge engines 114 to be tagged in other classifications as well, making the responses more accurate.

In alternate virtual assistants, the learning process occurs automatically using regulated processes in some systems, machine learning in other systems, and hybrid processing in other systems. A fully automated regulated process tags and classifies input using semantically relevant rules through a processor that instructs the virtual assistant to identify and classify knowledge-based responses and/or the predetermined or canned responses responsive to the input. The relevant rules identify additions, updates, and/or training data or vectors based on the confidence scores of the respective responses, with the antecedent requiring a rating greater than a predetermined value. An exemplary requirement may require confidence scores greater than seventy percent or about seventy percent. With the response tagged by a source designation and classified as coming from the one or more knowledge engines 114 or the one or more natural language processing engines 110 and/or 302, it is assigned to a topic by rule stored in memory and executed by a processor. Alternatively, it is assigned to a topic by one or more comparisons to previously designated or classified topic data sets based on prior classifications, prior designations, and/or prior empirical observations accessible to the processor.

As more tagging and classifications occur through the regulated process, the interactive agents learn to become more accurate and develop a deeper knowledge base. Because the rules are easy to understand and different rules can apply to different domains, the alternative automated virtual assistants can be customized to different domains with different virtual agents serving different domains making the interactive agents as a whole more sophisticated in time. These customizations make the alternative virtual assistants scalable and easy to maintain.

Figure 14:
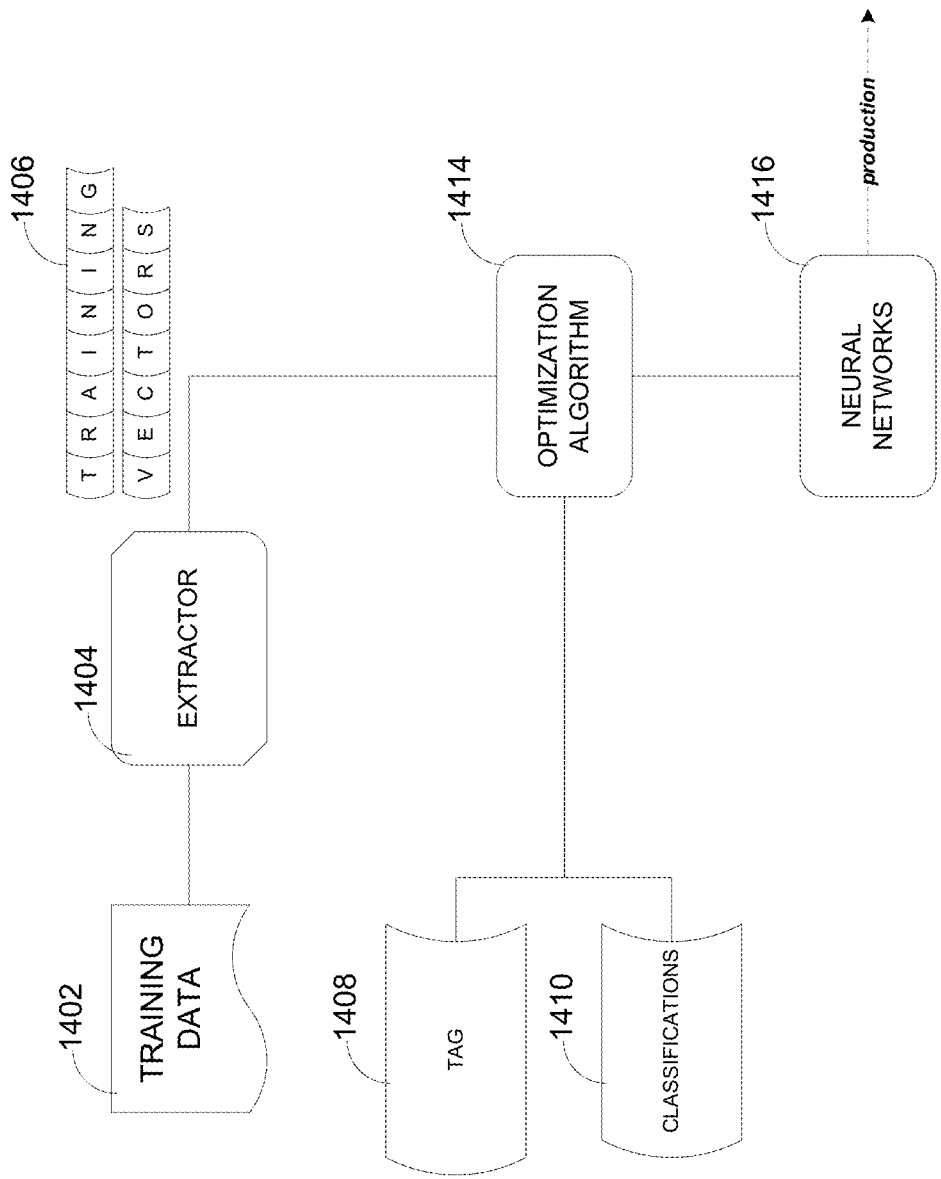
FIG. 14 is a block diagram of a system that trains neural networks.
Figure 15:
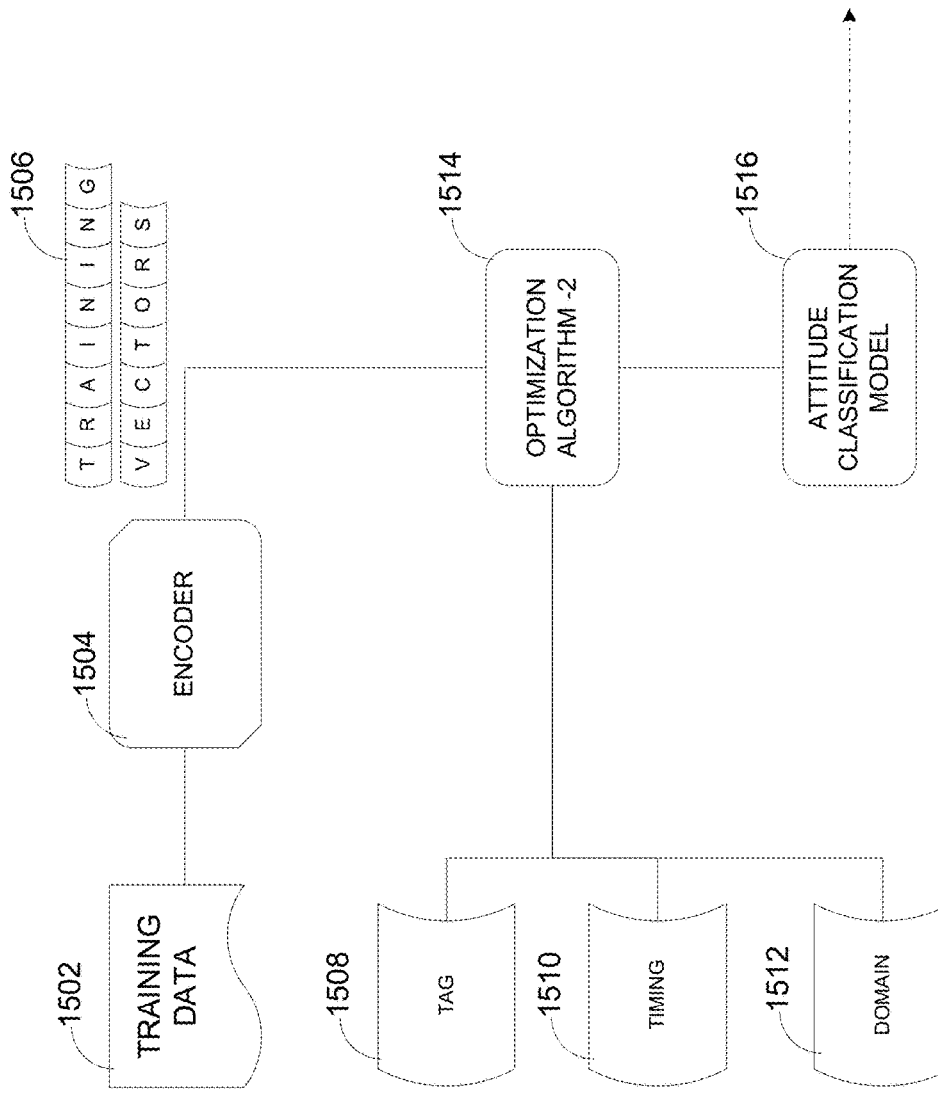
FIG. 15 is a block diagram of a system that renders attitude classification models.

Besides using regulated systems, an alternative virtual assistant uses machine training to automatically train the neural networks that serve the knowledge engines 114 and natural language processing engines 110 and/or 302 as shown in FIG. 14. By learning from earlier classifications, optimization algorithms 1414 use responses having ratings greater than a predetermined value, such as seventy percent, for example, as training data 1402. The training data allows the optimization algorithms 1414 to train the neural networks 1416. The training teaches the neural networks 1416 about different associations between a source input 1114 and the delivered response generated from one or more knowledge engines 114 and/or the one or more natural language processing engines 112 and/or 302 during their learning processes.

At periodic intervals or time periods, the optimization algorithms 1414 pull training data 1402 through an extractor 1404 to render training vectors 1406 representing the source input, intents, and entities with their associated tags, and classifications that are stored in a local or remote queue in memory. The training vectors 1406 are fed to the optimization algorithms 1414 such as one or more stochastic gradient descent learning algorithms with a machine learning backpropagation. The weights of the neural network 1416 are adjusted based on the quantified differences between the expected outcome and the outcomes produced by the optimization algorithms.

Training may occur during a predetermined number of training iterations, for a predetermined period of time, and/or until the optimization algorithms 1114 render an accuracy equal to or greater than an accuracy threshold during the learning session. Some optimization algorithms 1414 train by iteratively processing the training dataset set a predetermined number of times while tuning the neural network's hyperparameters, weights and/or other neural network's adjustable parameters/variables. Hyperparameters determine whether a neural network layer is turned on or off, the type of layer it is (e.g., a convolution layer, a pooling layer, a normalization layer, a rectified linear unit layer, etc.), the activation functions, the number of neurons of the layer, the kernel size, the stride, the padding, the learning rates, the weight initialization schemes for each layer, and/or etc. Once trained, the weights and hyperparameters of the neural network 1416 are adjusted based on the optimization algorithm's analysis. The modified neural networks are then evaluated by processing an evaluation dataset that is separate from and different from the training dataset.

Based on the trained neural network's performance, a fitness value or an average fitness value is derived. Because the fitness evaluation depends on the application and a desired accuracy level, the result of the fitness evaluation may vary. When a fitness value meets or exceeds a predetermined threshold, the neural network 1416 may be moved to or returned to production to serve as or assist the one or more knowledge engines 114 and/or the one or more natural language processing engines 110 and/or 302. In some systems, the fitness values are compared to a smoothed series of accuracy values that were generated by prior optimization algorithms that trained the prior neural networks that were placed in production. The smoothed series applies weights to accuracy values that represent higher accuracies than those applied to lower accuracy values.

In an exemplary use case, an initial smoothing is calculated from an initial set of accuracy values associated with previously trained neural networks. The set is then modified by replacing the lowest accuracy values of the series with the next highest accuracy values, which are weighted with the remaining accuracy values of the series. If an exemplary series comprises four accuracy values A, the smoothed accuracy value $S_t$ for the period of t can be expressed by equation 1.

$$S_t = \alpha A_t + (1-\alpha)\alpha A_{t-1} + (1-\alpha)^2 \alpha A_{t-2} + (1-\alpha)^3 \alpha A_{t-3}$$
$$\text{where } 0 \leq \alpha \leq 1 \quad (1)$$

The equation shows that $S_t$ comprises a weighted sum of the previous values in time back to time t=1. But the values further and further in the past have lighter and lighter weights since $\alpha$ and $1-\alpha$ are fractional values that become smaller as the training process multiplies them together and raises them to the powers as expressed in equation 1. Because $\alpha$ falls anywhere between zero and one, the process controls how much weight the current and past accuracy values in the accuracy series will receive. In a use case, when $\alpha$ is large, such as 0.80, for example, then the smoothed accuracy value $S_t$ will be comprised primarily of the current (higher) accuracy values of the series $A_t$, and only twenty percent of $S_t$ will depend on the historical accuracy values. If the goal is to raise the accuracy of the neural networks in view of increasing accuracy values, meaning little smoothing is needed, large constants are used. If the series has reached its accuracy peak, meaning most of the random accuracy values are removed, smaller smoothing constants are used, resulting in a relatively constant smoothed accuracy threshold value that reflects the historical accuracy values. In mature use cases, learning processes may use an $\alpha$ between about 0.1 and about 0.3 when establishing the accuracy threshold. Once the machine learning algorithm attains the calculated accuracy value, the trained neural network renders higher rated responses and is returned to production to make more accurate responses.

Besides using regulated systems to automate the virtual assistants and/or train the interactive agents, it is also used with the neural networks 1416 that serve as or serve the one or more knowledge engines 114 and/or the one or more natural language processing engines 112 and/or 302 in hybrid virtual assistant systems. Some hybrid virtual assistants use the machine trained neural networks 1416 and the disclosed regulated systems to ensure that the interactive agents provide even more accurate responses. These hybrid virtual assistants can be further optimized by simply adding rules that resolve conflicting tags, topic labels, and/or classifications to resolve response conflicts between the one or more one or more knowledge engines 114.

The disclosed interactive agent converses in an easy and familiar manner. It converses lightly and casually using an end user's style and vocabulary, in a fashion and a tone that is similar to, or indistinguishable from, that of human speech. The interactive agent moves beyond traditional desktop and mobile processing and is accessible via an application program interface within a celestial architecture. Each of the disclosed modules are not limited to one protocol or framework. The modular framework, data conversion (e.g., the ability to encode data a variety of different ways so that it can be seamlessly processed by different computers, operating systems, or programs), etc. allow the interactive agents to interface open source and/or private systems including legacy systems without recoding software to different languages, formats, and domains. Specific functionality may be added without updating the entire system (improving scalability), functionality may be isolated (e.g., separating running programs to mitigate system failures or software vulnerabilities from spreading to other software), and/or functionality may be removed through its use and management of modules and the translation of the data sourced to them via controller 106. The framework further enhances security (organizations can update selected software instead of waiting for holistic updates) and enhances productivity (when bottlenecks occur, additional modules may be added and plugged-in). The framework reduces the computational burden placed on other components and improves the functioning of the computer itself.

Some interactive agents also analyze and extract the mental disposition of the user when selecting a response or providing a predetermined answer. An attitude classifier 1802 identifies and extracts user feelings and/or opinions about matters by looking at input at certain times in certain domains that enable the interactive agents to identify user disposition. The interactive agents factor in classified data that represent emotion to provide a more accurate and a more robust response. The attitude classifier 1802 looks for certain phrases and words at points in time during the conversations to detect emotion. The interactive agents recognize that words alone are not accurate indicators of a user's emotion. For example, when a user says that he or she had an accident or has a crack in his or her windshield in an insurance claim servicing application, for example, the interactive agent understands that the user is not necessarily angry or frustrated. But, when an interactive agent receives a response such as "this is not helping", that was preceded by an automated or predetermined response, some interactive agents recognize that response to be a strong emotional indicator and they factor the detected emotion when delivering a response. In some interactive agents, an attitude detector's detection of key words through its comparisons of words and/or phrases to designated vocabularies indicative of emotional responses, the timing of the occurrence of those words, and the sequence of input within the interaction are processed by an attitude classifier to detect a user's attitude and determine an emotion such as a prevailing, positive, neutral, mixed, or negative tone, for example.

A positive tone classification classifies an input as expressing an overall positive emotion (e.g., characterized by displaying an acceptance or an affirmation). A negative tone classification classifies an input as expressing an overall negative emotion (e.g., characterized by displaying hostility or a denial). A mixed tone classification classifies an input as expressing both a positive and a negative emotion. And, a neutral tone classification classifies the input as not expressing either positive emotions or negative emotions (e.g., characterized by displaying little or no emotion).

An exemplary attitude classifier 1802 mines an input using comparisons to an emotional lexicon and a collection of precompiled emotional terms and phrases stored in memory 502. In some attitude classifiers 1802, the emotional terms and phrases are divided into classes that identify words and/or phrase's likely polarity as when the words match a positive, neutral, negative, or mixed class of words. One or more emotional lexicons that include the polarity divisions are used in alternate attitude classifiers 1802 to make the attitude classifiers 1802 more sensitive and faster in recognizing expressed emotions. These systems detect more subtle differences or domain specific emotions using a smaller emotional lexicon corpus that are faster to search than standalone emotional lexicons. The relevant rules identify semantic patterns that occur together that are associated with the polarity of the classified words through the comparisons. Some rules account for timing, by providing more weights to detections that directly follow an automated response delivered by the interactive agent and domains that are more likely to receive emotional responses, such as an interactive agent serving an insurance claims processing application. As more emotional terms and domains are identified and added to the emotional lexicon, the interactive agent's detection and classification's accuracy increases. Because different rules apply to different domains, some attitude classifiers are further customized to different domains making the interactive agents as a whole more responsive and sophisticated in time. These customized attitude classifiers 1802 are scalable, easy to maintain, and source the one or more knowledge engines 114 and the natural language processing engines 112 and/or 302 to modify interactive agent responses to reflect the detection and classification of the emotion of the user's input.

An alternate attitude classifier 1802 uses a second optimization algorithms 1514 to detect user attitudes and determine the emotion of the user's input such as a positive, neutral, mixed, or negative emotion, for example. In the learning process of FIG. 15, training data is processed by an encoder 1504 that converts the training data 1402 into a training vector 1506 using an encoding. In some applications, the training vector 140 represents the frequency of emotional words, and in some other applications, also includes the relative position of the words in a training string of the training data 1502. In other applications, the training vectors further includes other features associated with the training data 1502 such as emotional phrasing, their duration, intonation, etc. The training vectors 1506 are processed with tags 1508 associated with positive, negative, mixed, and neutral tags, timing/sequence within the dialogue (e.g., indicating if it occurred before or after an interactive agent's response) 1510, and the domain it is serving 1512 (e.g., quoting, claims processing, on-line servicing in an insurance context). The training vectors 1506, tags 1508, timing/sequence 1510, and/or domains 1512 are processed by the second optimization algorithm 1514 for a predetermined number of training iterations, for a predetermined period of time, and/or until the optimization algorithm 1416 reaches or exceeds a predetermined accuracy threshold. A predetermined accuracy based on the quantified differences between the expected outcome (e.g., the classification) and the outcomes produced by the second optimization algorithms 1514. While many optimization algorithms may be used, an exemplary attitude classifier used a support vector machines were used as the second optimization algorithm 1514 and the accuracy thresholds was calculated by the smoothing function described herein.

Figure 16:
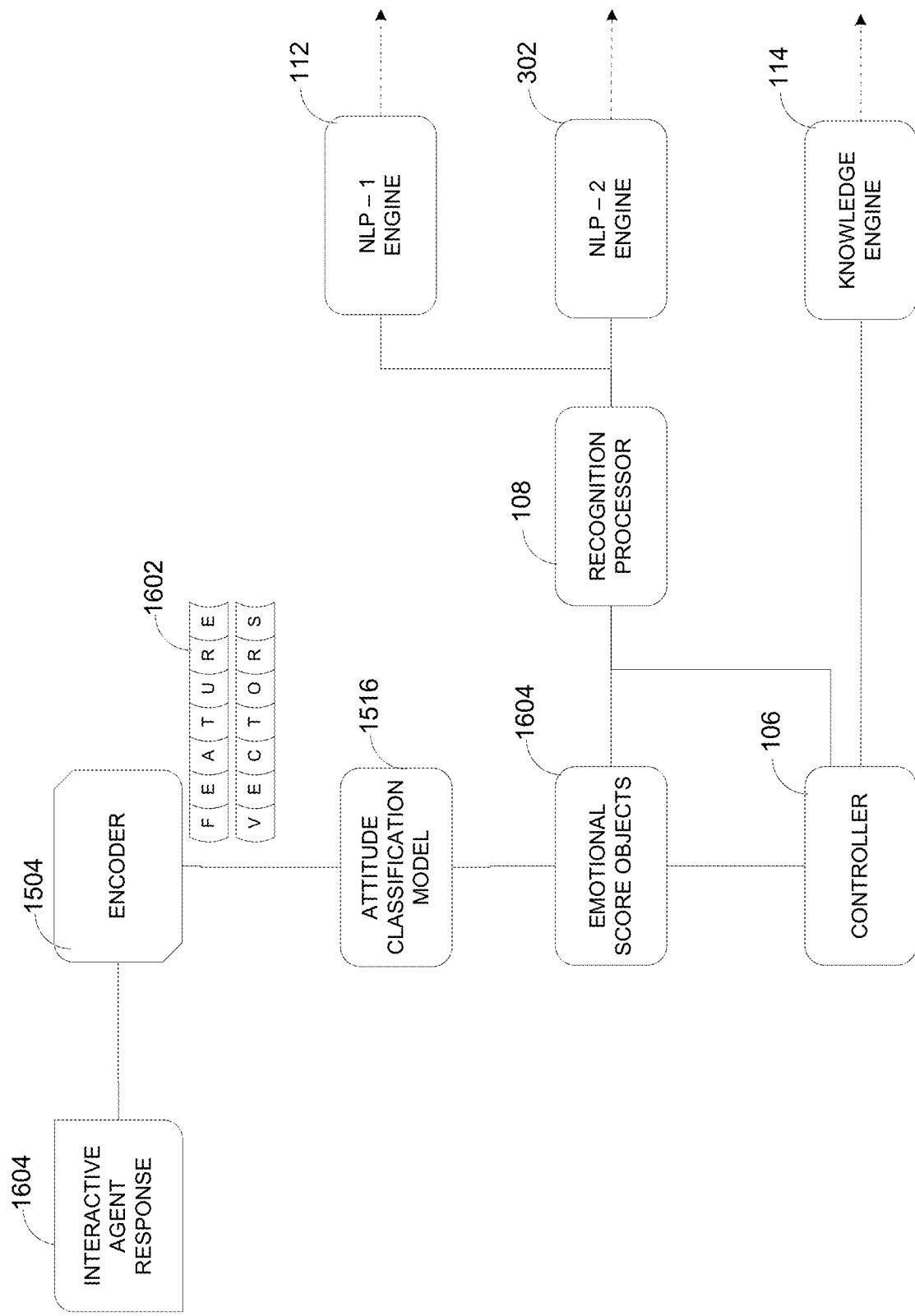
FIG. 16 is a block diagram of an attitude classification model interfacing portions of an intelligent conversational system.
Figure 17:
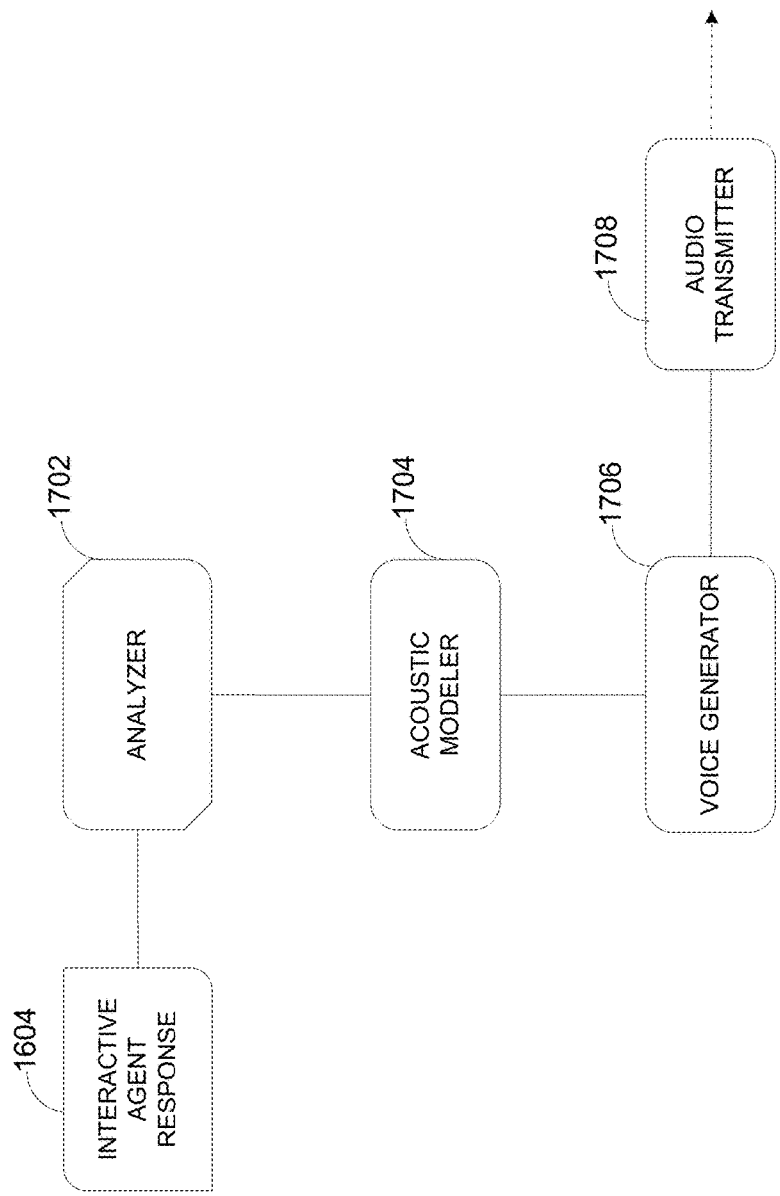
FIG. 17 is a block diagram of a system that creates one-of-a-kind natural voices that interface intelligent conversational system.

Once trained, the attitude classifier 1802 returns emotional score objects in response to an input through its attitude classification model 1516 as shown in FIG. 16. Using the encoder 1504, a feature vector 1602 is generated from the interactive agent's response 1604, which is then processed by the attitude classification model 1516. The attitude classifier model 1516 returns a list of emotional scores 1604 for each of the rated classes (e.g., positive, neutral, mixed, or negative classes) that sum to about one. The emotional ratings are processed by the one or more knowledge engines 114 and/or the one or more natural language processing engines 112 and/or 302 through the controller 106 and/or recognition processor 108, which return a response.

In an exemplary use case, an attitude classifier 1802 returns a "positive score"=0.0079, a "mixed score"=0.0401, a "neutral score"=0.0206, and a "negative score"=0.9205, which caused the interactive agents to respond with the suggestion to "speak to a representative". In this exemplary use case, when an input shows a highly polarized or negative response by a mixed score or negative score exceeding a predetermined value (e.g., 0.7), the interactive agents may return the response "speak to a representative", and in some interactive agent's route the user and/or the interaction to a different communication channel and/or a live human representative's queue, which is thereafter serviced by them.

The personalization's and customizations of the output of the interactive agents may also be used to generate a natural voiced output made through a voice talent (e.g., voice artists such as performers that provide their voices to convey information). One approach gathers audio recordings of voice scripts (text transcriptions) to train a voice model. An exemplary voice model generates a synthesized audio output by applying letters-to-sounds that map sequence of graphemes into sequences of phonemes and diacritic information which are stored in an acoustic inventory in the memory 502 through an acoustic modeler 1704 and a voice generator 1706. The voiced samples are harvested to generate phonemic representations that are suitable for connecting segments. The linking or concatenating scheme links short segments of previously uttered and stored audio speech to each other to generate an audio response.

Elements are selected from the acoustic inventory generated by the voice talent by selecting the phonemic representations to be used and converting them into parametric representations and then performing the connection and interpolation of the parameters. The selection begins by converting the input text string generated by the interactive agents into a phonemic text through a dyad selection from the list of inventory elements by an analyzer 1702 of FIG. 17. Approximately 2,900 different speech elements or dyads are used to generate all the phoneme combinations in some applications. Highly coarticulated phonemes are stored within polyphonic units. Fricatives are labeled by a single phoneme.

The input conversion process (e.g., the conversion algorithm) executed by the analyzer 1702 matches the longest possible input phoneme string to the dyad table from left to right. Then, the next longest possible input phoneme is matched. The process continues from left to right in this scheme until the input is matched. Because not all phonemes are stored, such as the transitions between fricatives and stops or between two fricatives, the conversion process identity stops by distinct selections, such as elements representing a closure and a burst. Since a closure is simply a silence, an element representing a silence is used, when it occurs. When a desired element does not exist, a substitute symbol representation is used for the missing element.

With the phenomes to acoustic inventory elements converted, the acoustic modeler 1704 retrieves the desired acoustic elements from the acoustic inventory using the elements name and reverse maps the other elements such as the elements that establish stops and closure, for example. After the elements are retrieved, they are joined sequentially or concatenated by interpolation that adjusts the duration of the phonemes by a voice generator 1706. As the phonemes are retrieved and joined using the acoustic inventory generated from the voice talent, the voice generator 1706 interpolates between previous retrieval acoustic elements and the acoustic elements linked or indexed to the subsequent recognized phenomes to synthesize the missing elements. The conversion process repeats on a sentence-by-sentence basis until the interactive agent's responses are converted into a natural audible speech that is transmitted by an audio transmitter 1708.

Figure 18:
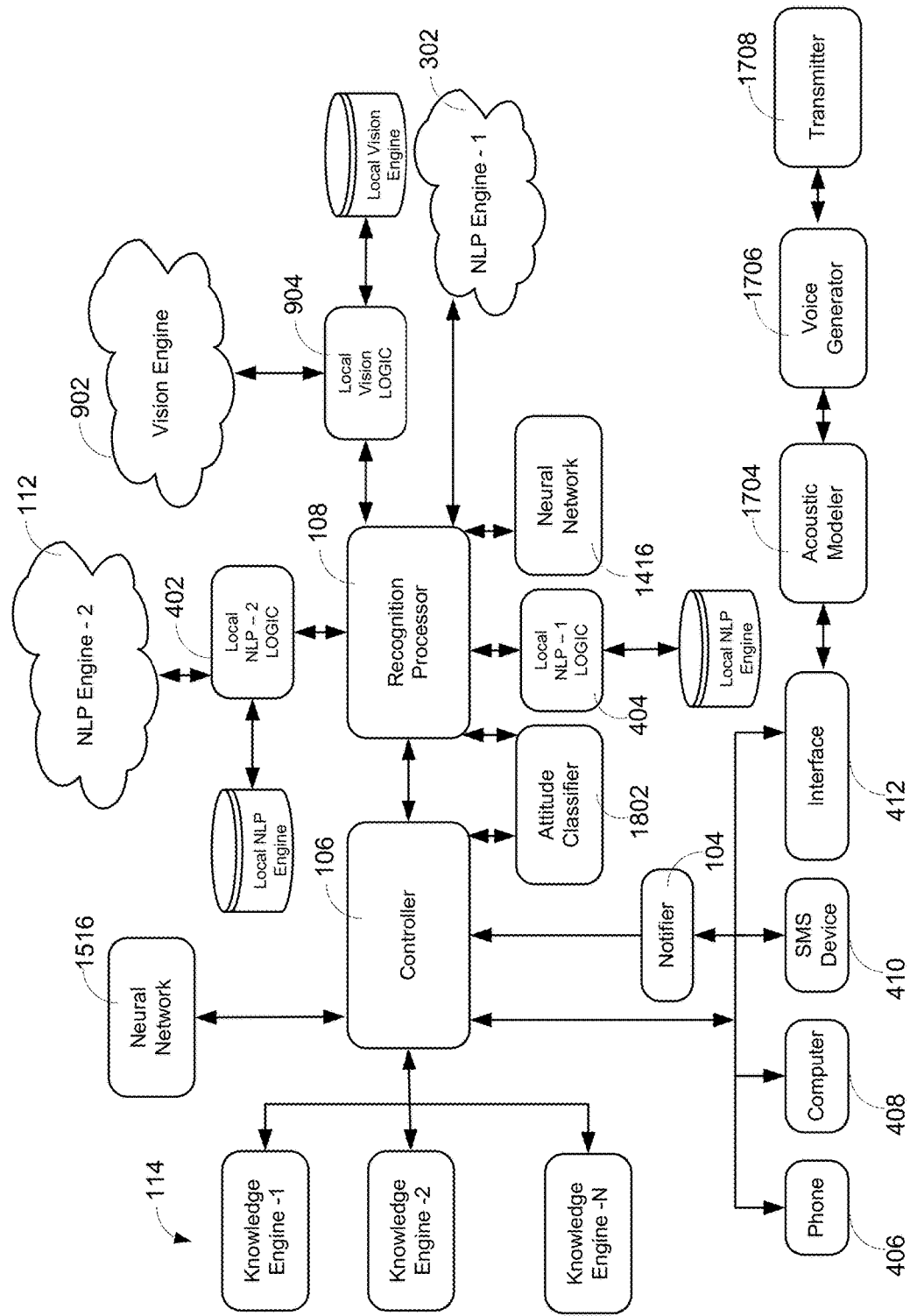
FIG. 18 is a block diagram of an intelligent conversational system with computer vision, an attitude classifier, and a virtual assistant, an acoustic modeler, and a voice generator.

FIG. 18 is a block diagram of the interactive agent that may execute the process flows described herein and/or associated with the systems and processes shown in FIGS. 1-17 automatically. In FIG. 18, the recognition processor 108 interfaces two natural language processing engines 112 and 302 through abstraction level logic 402 and 404 and a computer vision engine 902 through abstraction level logic 904. The natural language processing engines 112 and 302 may be local and/or cloud-based (e.g., remote). A natural language platform collects social media input such as textual interactions, passes the dialogue to one or more of the natural language processing engines 112 and 302 and/or computer vision engines 902, and passes the recognition results to controller 106. The recognition results are assigned confidence scores or ratings that reflect the likelihood of an accurate recognition by one or more natural language processing engines and/or computer vision engines. The natural language processing engines 112 and 302 and computer vision engine 902 are separate from the knowledge engines 114 (1 though N shown) that process the recognition results. Each knowledge engines 114 process specific types of recognized results. In some insurance systems, one knowledge engine handles insurance quoting, a second knowledge engine handles claims processing, a third knowledge engine handles insurance servicing of existing insurance policies, a fourth knowledge engine handles usage-based insurance, and/or a sixth knowledge engine handles other functions.

In FIG. 18, the interactive agent includes a session indicator 104 that initiates sessions and confirms their terminations. The session indicator 104 and controller 106 interfaces phones 406, computers 408, short-message-service devices 410, and other interfaces 412 that provide interactions with devices and users such as vehicles and/or smart homes. The interactions may be delivered by a natural voice made through an acoustic modeler 1704 and 1706 and delivered by a transmitter 1708. The mental disposition of a user or an input may control and/or affect the responses delivered by the interactive agents. The attitude classifier 1802 through the controller 106 and/or the recognition processor 108 detect and identify users' emotions using one or more emotional lexicons and a collection of precompiled emotional terms and phrases. The interactive agents process these detections and identifications to select or modify interactive agent responses. When a highly polarized or negative response is identified, for example, the interactive agents select one or more different knowledge engines 114 and/or natural language processors 112 and/or 302 to provide a predetermined answer. Some interactive agents route highly polarized responses to a customer service representative. To keep the one or more knowledge engines 114 and/or the one or more natural language processing engines 112 and/or 302 current, some interactive systems use a manual process, some use an automated regulated system, some use automated machine trained neural networks 1416, and some use hybrid systems. Hybrid systems use rules that resolve conflicting tags, topic labels, and/or classifications to resolve conflicts that may arise from machine trained neural network 1416 designations.

Alternate systems are not limited to the particular hardware and algorithms described above. Other suitable hardware and algorithms can be used. Furthermore, the systems are not limited to serving only insurance applications. Rather, the systems can serve may automated and/or manual systems across local and distributed networks. The systems illustratively disclosed herein may be suitably practiced in the absence of any element or module (including hardware and/or software), and in the absence of some or all of the described functions association with a process step or component or structure of a system that are expressly described. The systems may operate in the absence one or more of those process steps, elements and/or any subset of the expressed functions. Further, the various elements and modules described in each of the many interactive systems described herein is regarded as divisible with regard to the individual elements described, rather than inseparable as a whole. In other words, alternate systems encompass any variation and combinations of elements, components, and process steps described herein and may be made, used, or executed without the various elements described (e.g., they may operate in the absence of any element, including those elements, systems and/or processes or certain process steps disclosed in the prior art).

The subject-matter of the disclosure may also relate, among others, to the following aspects (referenced by numbers):

1. A system that simulates conversation with a human user, comprising:
   a recognition processor that receives media and converts the media into a system-specific format;
   a first natural language processing engine that compares the converted media to a vocabulary and generates a plurality of intents and a plurality of sub-entities; and
   a controller that transforms the plurality of intents and sub-entities into a pre-defined format and routes the plurality of intents and the plurality of sub-entities to a first selected knowledge engine and a second knowledge engine;
   where the first selected knowledge engine selects the second knowledge engine and each active grammar in the vocabulary uniquely identifies each of the plurality of knowledge engines.
2. The system of aspect 1 further comprising a knowledge base accessible to the plurality of knowledge engines that includes a plurality of attributes that identify a user's intention.
3. The system of aspect 2 where the knowledge base comprises a plurality of downloadable profiles.
4. The system of any of aspects 1 to 3 where the active grammars comprise a plurality of words and phrases to be recognized.
5. The system of any of aspects 1 to 4 where the plurality of knowledge engines comprises an insurance quoting knowledge engine, a claims processing knowledge engine, and an on-line insurance servicing knowledge engine.
6. The system of any of aspects 1 to 5 further comprising an exchange manager in communication with the controller that identifies the user's generation.
7. The system of aspect 6 where the exchange manager identifies a plurality of words or a phrase associated with the identified user's generation and renders the words or phrase on social media in response to the received media.
8 The system of any of aspects 1 to 7 further comprising a second natural language processing engine that compares a second converted media to the vocabulary and generates a second plurality of intents and a second plurality of sub-entities.
9. The system of aspect 8 where the first and the second natural processing engine comprises an automatic speech recognition service.
10. The system of any of aspects 1 to 9 further comprising a vision engine that transmits the location and identification of a physical object to the controller.
11. A method that simulates conversation with a human user, comprising:
    receiving media and converting the media into a system-specific format;
    comparing the converted media to a vocabulary and generating a plurality of intents and a plurality of sub-entities; and
    transforming the plurality of intents and sub-entities into a pre-defined format and routing the plurality of intents and the plurality of sub-entities to a first selected knowledge engine and a second knowledge engine;
    where the first selected knowledge engine selects the second knowledge engine and each active grammar in the vocabulary uniquely identifies each of the plurality of knowledge engines.
12. The method of aspect 11 further comprising accessing a plurality of attributes that identify a user's intention.
13. The method of aspect 12 where the plurality of attributes is stored in a plurality of downloadable profiles.
14. The method of any of aspects 11 to 13 where the active grammars comprise a plurality of words and phrases to be recognized.
15. The method of any of aspects 11 to 14 where the plurality of knowledge engines comprise an insurance quoting knowledge engine, a claims processing knowledge engine, and an on-line insurance servicing knowledge engine.
16. The method of any of aspects 11 to 15 further comprising an exchange manager in communication with the controller that identifies the user's generation.
17. The method of aspect 16 where the exchange manager identifies a plurality of words or a phrase associated with the identified user's generation and renders the words and phrases on social media in response to the received media.
18. The method of any of aspects 11 to 17 further comprising comparing a second converted media to the vocabulary and generating a second plurality of intents and a second plurality of sub-entities.
19. The method of aspect 18 where the first and second plurality of intents and the first and second plurality of sub-entities identify speech.
20. The method of any of aspects 11 to 19 further comprising a vision engine that transmits the locations and identifications of a physical object to the controller.
21. A non-transitory machine-readable medium encoded with machine-executable instructions, where execution of the machine-executable instructions is for:
    receiving media and converting the media into a system-specific format;
    comparing the converted media to a vocabulary and generating a plurality of intents and a plurality of sub-entities; and
    transforming the plurality of intents and sub-entities into a pre-defined format and routing the plurality of intents and the plurality of sub-entities to a first selected knowledge engine and a second knowledge engine;

where the first selected knowledge engine selects the second knowledge engine and each active grammar of the vocabulary uniquely identifies each of the plurality of knowledge engines.

22. The non-transitory machine-readable medium of aspect 21 further comprising accessing a plurality of attributes that identify a user's intention.

23. The non-transitory machine-readable medium of aspect 22 where the plurality of attributes is stored in a plurality of downloadable profiles.

24. The non-transitory machine-readable medium of any of aspects 21 to 23 where the active grammars comprise a plurality of words and phrases to be recognized.

25. The non-transitory machine-readable medium of any of aspects 21 to 23 where the plurality of knowledge engines comprise an insurance quoting knowledge engine, a claims processing knowledge engine, and an on-line insurance servicing knowledge engine.

26. The non-transitory machine-readable medium of any of aspects 21 to 25 further comprising an exchange manager in communication with the controller that identifies the user's generation.

27. The non-transitory machine-readable medium of aspect 26 where the exchange manager identifies a plurality of words or a phrase associated with the identified user's generation and renderers them on social media in response to the received media.

28. The non-transitory machine-readable medium of any of aspects 21 to 27 further comprising comparing a second converted media to the vocabulary and generating a second plurality of intents and a second plurality of sub-entities.

29. The non-transitory machine-readable medium of aspect 28 where the first and second plurality of intents and the first and second plurality of sub-entities identify speech.

30. The non-transitory machine-readable medium of any of aspects 21 to 29 further comprising a vision engine that transmits the locations and identifications of a physical object to the controller.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A system that simulates conversation with a human user, comprising:
   a speech engine that processes a plurality of spoken utterances received from the human user into a plurality of representations;
   the speech engine compares the plurality of representations to a first vocabulary to render a speech output comprising a plurality of interpretations of the plurality of spoken utterances, process commands, and intents;
   a recognition processor that receives the speech output and converts the speech output into a system-specific format;
   a first natural language processing engine that compares the speech output to a second vocabulary and generates a plurality of second intents and a plurality of sub-entities; and
   a controller that transforms the plurality of second intents and the plurality of sub-entities into a pre-defined format and routes the plurality of second intents and the plurality of sub-entities to a first selected knowledge engine and a second knowledge engine;
   where the first selected knowledge engine selects the second knowledge engine based on a knowledge base and a downloadable profile;
   where the first selected knowledge engine or the second knowledge engine engages with the human user through one or more dialogues based on a personality type of a fictional character; and
   where the one or more dialogues is rendered through an acoustic modeler and a voice generator that deliver a natural-sounding voice through a plurality of audio samples.

2. The system of claim 1 where the one or more dialogues are indistinguishable from human speech.

3. The system of claim 2 where the system converses in an auditory tone that comprise human speech.

4. The system of claim 3 where the personality type is rendered through a customized vocabulary file that models traits of the fictional character.

5. The system of claim 1 where the personality type is rendered through a customized vocabulary file that models traits of the fictional character.

6. The system of claim 1 where the personality type is rendered through a customized vocabulary file and a programmable logic selectable by the recognition processor that models traits of the fictional character.

7. The system of claim 1 where the dialogue is rendered from a customized vocabulary and a programming logic selectable by the first and the second knowledge engine.

8. The system of claim 1 where the dialogue is rendered from a customized vocabulary and a programming logic selectable by the controller.

9. The system of claim 1 further comprising an attitude classifier that modifies the one or more dialogues in response to an attitude classifier that rates a mental disposition of a user by analyzing the plurality of spoken utterances.

10. The system of claim 9 where the attitude classifier classifies in configured to classify the plurality of spoken utterances as expressing a positive emotion, a neutral emotion, a negative emotion, and a mixed emotion.

11. The system of claim 1 further comprising an exchange manager that updates the first vocabulary through a regulated process that tags and classifies an input when the one or more dialogues comprising an input has a rating value greater than a smoothed predetermined value.

12. The system of claim 1 where the first selected knowledge engine and the second knowledge engine comprise an insurance quoting knowledge engine, a claims processing knowledge engine, or an on-line insurance servicing knowledge engine.

13. The system of claim 1 further comprising a second natural language processing engine that compares an output from the recognition processor to a third vocabulary and generates a third plurality of intents and a second plurality of sub-entities.

14. A method that simulates conversation with a human user, comprising:
   processing a plurality of spoken utterances received from the human user to a plurality of representations through a speech engine;
   comparing the plurality of representations to a first vocabulary to render an output comprising a plurality of interpretations of the plurality of spoken utterances, process commands, and intents;
   receiving the output and converting the output into a system-specific format at a recognition processor;

comparing the output to a second vocabulary and generating a plurality of second intents and a plurality of sub-entities at a first natural language processing engine; and transforming the plurality of second intents and the plurality of sub-entities into a pre-defined format, and routing the plurality of second intents and the plurality of sub-entities to a first selected knowledge engine and a second knowledge engine at a controller;

where the first selected knowledge engine selects the second knowledge engine based on a knowledge base and a downloadable profile;

where the first selected knowledge engine or the second knowledge engine engages with the human user through one or more dialogues based on a personality type of a fictional character; and where the one or more dialogues is rendered through an acoustic modeler and a voice generator that deliver a natural-sounding voice through a plurality of audio samples.

15. The method of claim 14 where the one or more dialogues are indistinguishable from human speech.

16. The method of claim 15 where the method tracks the one or more dialogues through an exchange manager and updates the first vocabulary through a backpropagation based on the one or more dialogues and a virtual assistant.

17. The method of claim 16 where the exchange manager and the virtual assistant monitor and manage a plurality of physically separated and logically separated networks.

18. The method of claim 17 where virtual assistant renders a landing page providing information on each of the plurality of physically separated and logically separated networks.

19. The method of claim 18 where the virtual assistant includes a filter that sorts the information based on a relevance criteria that measure key words and an occurrence of a plurality of weighted key words.

20. The method of claim 18 where the virtual assistant comprises a fully automated regulated system that is rule based.

21. The method of claim 16 where the virtual assistant comprises a neural network.

22. The method of claim 14 further comprising a knowledge base accessible to the first selected knowledge engine or the second knowledge engine that includes a plurality of attributes that identify a human user's intention.

23. The method of claim 14 further comprising an attitude classifier that modifies the one or more dialogues in response to an attitude classifier that rates a mental disposition of a user by analyzing the plurality of spoken utterances.

24. The method of claim 14 where the second vocabulary comprises active grammars that include a plurality of words and phrases to be recognized.

25. The method of claim 14 where the first selected knowledge engine and the second knowledge engine comprise an insurance quoting knowledge engine, a claims processing knowledge engine, or an on-line insurance servicing knowledge engine.

26. The method of claim 14 further comprising a second natural language processing engine that compares an output from the recognition processor to a third vocabulary and generates a third plurality of intents and a second plurality of sub-entities.

27. A non-transitory machine-readable medium encoded with machine-executable instructions, where execution of the machine-executable instructions is for:

processing a plurality of spoken utterances received from a human user to a plurality of representations through a speech engine;

comparing the plurality of representations to a first vocabulary to render an output comprising a plurality of interpretations of the plurality of spoken utterances, process commands, and intents;

receiving the output and converting the output into a system-specific format at a recognition processor;

comparing the output to a second vocabulary and generating a plurality of second intents and a plurality of sub-entities at a first natural language processing engine; and transforming the plurality of second intents and the plurality of sub-entities into a pre-defined format and routing the plurality of second intents and the plurality of sub-entities to a first selected knowledge engine and a second knowledge engine at a controller;

where the first selected knowledge engine selects the second knowledge engine based on a knowledge base and a downloadable profile; and where the first knowledge engine or the second knowledge engine engages with the human user through one or more dialogues based on a personality type of a fictional character and is updated by a virtual manager through a backpropagation;

where the one or more dialogues is rendered through an acoustic modeler and a voice generator that deliver a natural-sounding voice through a plurality of audio samples.

28. The non-transitory machine-readable medium of claim 27 where the one or more dialogues are indistinguishable from human speech.

29. The non-transitory machine-readable medium of claim 28 where the non-transitory machine-readable medium renders an output that converses in an auditory tone that is indistinguishable from human speech.

30. The non-transitory machine-readable medium of claim 27 further comprising an attitude classifier that modifies the one or more dialogues in response to an attitude classifier that rates a mental disposition of a user by analyzing the plurality of spoken utterances.

* * * * *